(12) United States Patent
Oddsen, Jr.

(10) Patent No.: US 6,736,364 B2
(45) Date of Patent: May 18, 2004

(54) MODULAR MOUNTING ARM

(75) Inventor: Odd N. Oddsen, Jr., Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 0 days.

(21) Appl. No.: 10/061,880

(22) Filed: Feb. 1, 2002

(65) Prior Publication Data

US 2003/0146359 A1 Aug. 7, 2003

(51) Int. Cl.$^7$ ................................................ F16M 13/00
(52) U.S. Cl. ................ 248/585; 248/284.1; 248/278.1; 248/281.11; 248/919
(58) Field of Search ............................. 248/585, 284.1, 248/286.1, 278.1, 279.1, 281.11, 274.1, 280.11, 282.1, 919

(56) References Cited

U.S. PATENT DOCUMENTS

| | | | |
|---|---|---|---|
| 999,283 A | | 8/1911 | White |
| 2,151,877 A | * | 3/1939 | Walker .................. 248/123 |
| 2,731,223 A | * | 1/1956 | Riccio ..................... 248/41 |
| 3,131,900 A | | 5/1964 | Anderson et al. |
| 3,424,419 A | | 1/1969 | Siegel |
| 3,489,383 A | | 1/1970 | Anson |
| 3,905,311 A | * | 9/1975 | Carpentier .............. 108/136 |
| 4,208,028 A | * | 6/1980 | Brown et al. ............. 224/185 |
| 4,266,747 A | | 5/1981 | Souder, Jr. et al. |
| 4,494,177 A | | 1/1985 | Matthews |
| 4,687,167 A | | 8/1987 | Skalka et al. |
| 4,695,024 A | | 9/1987 | Haven |
| 4,708,312 A | | 11/1987 | Rohr |
| 4,768,744 A | | 9/1988 | Leeds et al. |
| 4,770,384 A | | 9/1988 | Kuwazima et al. |
| 4,821,159 A | | 4/1989 | Pike |
| 4,852,500 A | | 8/1989 | Ryburg et al. |
| 4,852,842 A | | 8/1989 | O'Neill |
| 5,123,621 A | | 6/1992 | Gates |
| 5,174,531 A | | 12/1992 | Perakis |
| 5,390,685 A | | 2/1995 | McCoy |
| 5,437,427 A | | 8/1995 | Johnson |
| 5,584,596 A | | 12/1996 | Greene |
| 5,628,482 A | * | 5/1997 | Iravantchi et al. .......... 108/143 |
| 5,642,819 A | | 7/1997 | Ronia |
| 5,664,750 A | | 9/1997 | Cohen |
| 5,743,503 A | | 4/1998 | Voeller et al. |
| 5,799,917 A | * | 9/1998 | Li ........................... 248/284.1 |
| 6,012,693 A | | 1/2000 | Voeller et al. |
| 6,076,785 A | | 6/2000 | Oddsen, Jr. |
| 6,179,263 B1 | | 1/2001 | Rosen et al. |
| 6,257,538 B1 | * | 7/2001 | Pangborn et al. ......... 248/284.1 |
| 6,273,383 B1 | * | 8/2001 | Oddsen, Jr. .............. 248/284.1 |
| 6,409,134 B1 | * | 6/2002 | Oddsen, Jr. .............. 248/274.1 |

* cited by examiner

*Primary Examiner*—Ramon O. Ramirez
*Assistant Examiner*—Amy J. Sterling
(74) *Attorney, Agent, or Firm*—Lerner, David, Littenberg, Krumholz & Mentlik, LLP

(57) ABSTRACT

An articulated modular mounting arm for mounting electronic peripheral devices in a statically balanced adjustable position is disclosed. This mounting arm differs from the prior art in that several of its components are constructed from lengths of stock materials that are cut down to a user specified length within preset limits. This enables the manufacture to reduce inventory of the various components because one stock component may serve the need for several length arms. In addition, molds for each of the various lengths are not required, further lowering the production costs.

52 Claims, 20 Drawing Sheets

MODULAR MOUNTING ARM

BACKGROUND OF THE INVENTION

This invention relates in general to an apparatus for mounting devices, and more specifically, to a modular articulating extension arm for mounting electronic peripheral devices in a statically balanced adjustable position.

Articulated extension arms for mounting electronic peripheral devices, such as computer monitors, notebook computers, internet computers, video cassette recorders, cameras, computer keyboards, televisions, and the like are well known in prior art. For example, there is known from O'Neill, U.S. Pat. No. 4,852,842; Greene, U.S. Pat. No. 5,584,596; and Voeller et al., U.S. Pat. No. 5,743,503 various mechanical support arms.

Due to recent advances in flat-screen technology, there is a demand for adjustable extension arms particularly suited for use with flat-screen devices, such as flat-screen computer monitors and televisions. One such example is described in Applicant's U.S. patent application Ser. No. 09/405,628 filed Sep. 24, 1999 entitled "Arm Apparatus For Mounting Electronic Devices." Another example is described in Applicant's U.S. patent application Ser. No. 09/406,006 filed Sep. 24, 1999 entitled "Arm Apparatus for Mounting Electronic Devices with Cable Management System." The disclosures of these applications are incorporated herein by reference.

FIGS. 1 through 7, including their respective sub-figures, disclose an extension arm for mounting an electronic peripheral device in accordance with Applicant's prior extension arms. The main elements of the extension arm are a first endcap 100, upper channel 200, lower channel 300, suspension device 400, second endcap 500 and forearm extension 600. The extension arm is capable of supporting an electronic device attached to a mounting device, such as a tilter 700, and also provides an internal cable management system for a cable 900.

The first endcap 100 has an endcap shaft 101 that may contain a plurality of concentric circumferential grooves 114. The endcap shaft 101 may be pivotably attached to a rigid support mount (not shown), such as an orifice sized to accept the endcap shaft 101 or a track configured and sized to slidably engage the grooves 114 provided, or both.

The first endcap 100 contains two pairs of holes 113 (see FIG. 2) therethrough such that pins 102 may pivotally couple the upper channel 200 and lower channel 300 to the first endcap 100. Similarly, the second endcap 500 contains two pair of holes 513 (see FIG. 2) disposed therethrough such that pins 550 pivotally couple the opposite ends of the upper channel 200 and the lower channel 300 to the second endcap.

The combination of the upper and lower channels 200, 300 and the first and second endcaps 100, 500 form an adjustable parallelogram that permits a device coupled to the forearm extension 600 to be raised and lowered to a desirable height. The parallelogram retains its position by employing a suspension device 400, which is pivotally and adjustably attached to the first endcap 100 and the upper channel 200, as will be further described below. Generally, the suspension device 400 is sized so as to have a fixed length until an upward or downward force is exerted at the second endcap 500 that exceeds the suspension device's designed resistance. One suitable suspension device 400 is a gas filled piston known for this purpose and commercially available from a variety of manufacturers. Typically, such a gas filled piston will have an adjustable resistance with a range suitable for use in accordance with the weight of the electronic peripheral device specified. Thus, the suspension device 400 causes the parallelogram to retain its position when the only force exerted at the second endcap 500 is the weight of the device, but permits the parallelogram to be adjusted when a user pushes the electronic peripheral device up or down.

A first female coupling 602 couples the second endcap 500 to the forearm extension 600 while a second female coupling 603 couples the opposite end of the forearm extension 600 to the mounting device, such as the tilter 700. Thereafter, the mounting device may be coupled to the electrical peripheral device. The electrical peripheral device may in turn have a cable 900 of sufficient length and diameter as to permit its placement through the forearm extension 600, second endcap 500, and lower channel 300, so as not to be visible in those areas.

FIGS. 3A through 3E illustrate the first endcap 100, having the endcap shaft 101 disposed on a first end 103 of the first endcap 100. In accordance with one embodiment as shown in FIG. 3A, the endcap shaft 101 has an endwall 181 with a hole 104 formed at its first end 103. The first endcap 100 also has a second end 105 with an endwall 151 having a hole 106 disposed therethrough. Within the holes 104, 106 and between a pair of trough walls 158, is a threaded rod 107. A first end 108 of the threaded rod 107 is inserted into the hole 104 at the base of the endcap shaft 101. A second end 109 of the threaded rod 107 is aligned with the hole 106 and held in place with a clip 110. The clip 110 is fastened to an inner surface of the first endcap 100 by screws 111.

In accordance with the preferred embodiment as shown in FIG. 3B, the first endcap 100 further includes a sidewall 152 between the endwalls 151 forming a partially enclosed housing 150. The endcap shaft 101 is typically integrally molded to the endwall 151 of the first endcap 100. Preferably, the entire first endcap 100 (the partially enclosed housing 150 and the endcap shaft 101) is molded from zinc. Within the partially enclosed housing 150 and integrally molded on the sidewall 152 are a plurality of stops 153 disposed in proximity to the endwalls 151. Also within the partially enclosed housing 150 are the trough walls 158, disposed longitudinally along the inner surface of the sidewall 152 between the endwalls 151 so as to define a trough 159 therebetween.

The stops 153 serve to provide limits of upward or downward movement of the upper channel 200 and lower channel 300 when the ends of the upper channel 200 and lower channel 300, respectively, meet the stops 153 when one moves the electronic peripheral device in extended or contracted positions. The trough 159 disposed between the trough walls 158 allows a clevis 120 to be moved therein. As discussed in more detail later, the clevis provides connection and adjustment means for one end of the suspension device 400.

FIG. 3C illustrates a variation of the first endcap 100 in accordance with the preferred embodiment, wherein shelves 160 define co-planar faces separated by a groove 161. The shelves 160 have a connection means, such as self-tapping screw holes 162 disposed therein. The co-planar faces of the shelves 160 are configured to engage a retainer clip 163, which is fastened in place, for example, by a pair of screws 164. When the retainer clip is fastened in place, the groove 161 defines a space for accepting one end 108 of the threaded rod 107.

The threaded rod 107 is employed within the first endcap 100 so as to adjustably support the clevis 120. FIG. 3D illustrates the threaded rod 107, the second end 109 of which has a circular cross-section within which is axially disposed a shaped opening 165, for example, a hex-shaped opening for accepting a shaped key (not shown), such as a hex-shaped key. The cross-sectional diameter of the second end 109 is smaller than a cross-sectional diameter of the hole 106, so as to be inserted therein. Adjacent the second end 109 is a shoulder 166. The shoulder 166 has a circular cross-section of a diameter larger than the cross-sectional diameter of the hole 106. Thus, the shoulder 166 abuts an inner surface of the endwall 151 and retains the second end 109 within the hole 106.

The first end 108 of the threaded rod 107 is disposed in the groove 161 located between the shelves 160 of the first endcap 100 (see FIG. 3B) or the hole 104 of the endcap shaft 101 (see FIG. 3A) The first end 108 of the threaded rod 107 has a circular cross-section having a diameter that is smaller than the size of the groove 161 or the hole 104, such that the first end 108 is supported between the shelves 160 but is free to rotate therein.

Between the first end 108 and the second end 109 of the threaded rod 107 is a threaded section 167. Threadably mounted on the threaded section 167 is the clevis 120. The clevis 120 as illustrated in FIG. 3E, has a tapped hole 121 formed therein for receiving the threaded rod 107. The clevis 120 also has a pair of fastening members 123 at a first end 122 to which are fastened a first end of the suspension device 400. The second end 124 of the clevis is configured so as to slidably engage the trough 159.

The second end 109 of the threaded rod 107 can be engaged by a shaped key to rotate the threaded rod 107 around its axial centerline. When the threaded rod 107 is rotated around this axis of rotation, the clevis 120 travels along the length of the threaded rod 107 in a direction corresponding to the direction which the shaped key is turned. This movement of the clevis 120 adjusts the length of the suspension device 400 thereby altering its resistance.

FIGS. 4A through 4D illustrate several views of the upper channel 200 according to the prior art. The upper channel 200 includes a U-shaped body 201 and integrally cast rollers 202 disposed at opposite ends of the U-shaped body 201. The rollers 202 can also be separately constructed and subsequently welded onto the ends of the U-shaped body 201 as disclosed in Applicant's aforementioned patent applications. The U-shaped body 201 comprises a channel bottom 203 from which extend two channel sidewalls 204. For heavy weight electronic peripheral devices, the channel bottom 203 and the sidewalls 204 are typically stamped from heavy gauge steel with the rollers 202 being welded thereto. For lightweight electronic peripheral devices, the channel bottom 203, the sidewalls 204 and the rollers 202 of the upper channel 200 are typically integrally cast from zinc, giving the upper channel a lesser weight and degree of rigidity more appropriate for the lighter weight application.

Cast molded upper channels 200 permit the angle between the channel bottom 203 and the channel sidewalls 204 to be exactly the same for each manufactured upper channel 200. Moreover, cast molding permits the sidewalls 204 to be tapered. As illustrated in FIGS. 4(c) and 4(d), both an outer surface and an inner surface of the sidewalls 204 may taper in, for example, by approximately 1 degree. The taper allows for clearance between the upper and lower channels 200, 300 when the upper and lower channels 200, 300 are brought together during usage. That is, the inner surface of the sidewalls 204 being displaced by 1 degree means that there is additional clearance for the lower channel 300 to fit there within. The addition clearance ensures that the upper channel 200 and lower channel 300 will not scrape together during usage.

The rollers 202 have a hole 205 therethrough (either cast in or subsequently drilled) for receiving a connection mechanism, such as pins 102, 550. Additionally, the channel bottom 203 includes an integrally cast threaded hole configured and sized to receive a threaded end ball stud 207. The ball stud is configured and sized to receive a second end of the suspension device 400.

FIGS. 5A through 5E illustrate several views of the lower channel according to the prior art. The lower channel 300 includes a U-shaped body 301 and integrally cast rollers 302 disposed at opposite ends of the U-shaped body 301. The U-shaped body of the lower channel 300 includes a channel bottom 303 from which extend two channel sidewalls 304. As with the upper channel 200 components, for heavy weight electronic peripheral devices, the channel bottom 303 and the sidewalls 304 of the lower channel 300 are typically stamped from heavy gauge steel, the rollers 302 being welded thereto. For lightweight electronic peripheral devices, the channel bottom 303, the sidewalls 304 and the rollers 302 of the lower channel 300 are typically integrally cast from zinc, giving the lower channel a lesser weight and degree of rigidity more appropriate for the lighter weight application. The rollers 302 have a hole 305 therethrough (either cast or subsequently drilled) for receiving a connection mechanism, such as the pins 102, 550.

The channel bottom 303 additionally includes a cable channel 306 running longitudinally there along. Typically, a first end 307 of the cable channel 306 starts near the end of the channel bottom 303 that pivotably connects to the first endcap 100. The cable channel 306 then runs along the entire length of the channel bottom 303 to the end of the channel bottom that pivotably connects to the second endcap 500. The second end 308 of the cable channel 306 provides an opening between the rollers 302. The first end 307 may be, for example, rounded to improve the rigidity of the lower channel 300. The cable channel 306 is configured to receive a cable cover 325 (illustrated in FIG. 5E) which is configured to removably fit within the cable channel. Thus, cables 900 of the mounted device may be substantially retained within the lower channel 300 so as to hide them from view and protect them from harm. The cable channel 306 and the cable cover 325 enable cables to be accessed when desired, while securing them within the lower channel 300.

As illustrated in FIGS. 5C and 5D the sidewalls 304 of the lower channel 300 are also tapered. For example, an outer surface of the sidewalls 304 may be tapered approximately ½ degree while an inner surface may be tapered approximately 1 degree. It should be noted that the taper is not limited to a particular angle, and that the taper of the inner surface and the outer surface may be the same. The taper is possible because the lower channel 300 is typically cast molded. As noted above with respect to the upper channel 200, the taper provides more clearance between the upper channel 200 and the lower channel 300 so as to reduce or eliminate the chance of the upper and the lower channels 200, 300 scraping.

As illustrated in FIG. 5E, the cable cover 325 includes a top cover 326 with two sidewalls 327 extending therefrom. A far end of each sidewall 327 has a catch 328 formed thereon so as to engage with the cable channel 306. Typically, the cable cover 325 is molded from plastic and is sufficiently flexible so that the stops 328 may be engaged and disengaged from the cable channel 306 as necessary.

The cover is not, however, so flexible that the stops 328 naturally flex such that the cable cover 325 fails to engage with the cable channel 306.

As illustrated in FIGS. 6A through 6I the second endcap 500 includes a partially enclosed housing 501 and a shaft assembly 502. The partially enclosed housing 501 has a first endwall 503 and a second endwall 504 oppositely disposed from each other and fixedly connected by a sidewall 505. The sidewall 505 extends partially around the partially enclosed housing 501 so as to permit manipulation of components, such as cables, which may be contained there within. The first endwall 503 has a hole 506 disposed therethrough and threaded holes 507 disposed therein that are in communication with the hole 506. Typically, the diameter of the hole 506 is large enough to allow a plug end of a cable to fit therethrough. Disposed within the threaded holes 507 are set screws 508.

As illustrated in FIGS. 6E through 6G, the shaft assembly 502 typically includes two symmetrical endcap adapters 509 which when assembled provide the boundaries for a hollow shaft 510. The endcap adapters 509 have a mounting end 511 and a shaft end 512 that is thinner than the mounting end 511. As illustrated in FIG. 6D, the mounting ends 511 of both of the endcap adapters 509 are inserted into the hole 506 and are coupled together and to the partially enclosed housing 501, to form the second endcap 500, by tightening the set screws 508.

As stated earlier, the upper and the lower channels 200, 300 and the first and the second endcaps 100, 500 are configured so as to form an adjustable parallelogram. When configured, the shaft 101 of the first endcap 100 and the hollow shaft 510 of the second endcap 500 point in opposite directions. For example, as illustrated in FIG. 2, the shaft 101 of the first endcap 100 extends vertically downward while the hollow shaft 510 of the second endcap 500 extends vertically upward. The shape of the parallelogram is retained by the suspension device 400. As previously mentioned, the first end of the suspension device 400 is adjustably mounted to the clevis 120 within the first endcap 100 and the second end is attached to the ball stud 207 mounted within the upper channel 200.

Generally, the suspension device 400 is sized so as to have a fixed length until an upward or downward force is exerted at the second endcap 500 that exceeds the suspension device's designed resistance. Thus, the suspension device 400 retains the parallelogram shape when the only force exerted at the second endcap 500 is the weight of the electronic peripheral device. However, the suspension device 400 permits the parallelogram shape to be adjusted when a user pushes the electronic peripheral device coupled to the forearm extension 600 up or down.

With reference to FIGS. 7A and 7B, the forearm extension of the prior art includes a body 601 having a first female coupling 602 located on a first end and a second female coupling 603 located on a second end. The first female coupling 601 has an inner diameter 604 that is sized to rotatably engage the hollow shaft 510 of the second endcap 500. The first female coupling 602 is also configured to receive a cable through the hollow shaft 510. That is, the first female coupling 602 has a cable slot 605 formed therein, for example by milling the cable slot 605 into the first female coupling 602, or by casting the first female coupling 602 with the cable slot 605 integrally formed therein.

The first female coupling 602 generally has a set screw 606 formed within a wall 607 thereof. The set screw 606 can be tightened to prevent the first female coupling 602 from rotating about the hollow shaft 510. Advantageously, the first female coupling 602 has a plurality of voids 608 formed in the wall 607, which saves on material costs and weight and permits the forearm extension 600, when cast, to be cooled more quickly.

A bushing 609 (see FIG. 2) is preferably used to engage the first female coupling 602 and the hollow shaft 510. That is, the bushing 609 is placed over the hollow shaft 510 and within the first female coupling 602. The bushing 609 is preferably made of a smooth material, such as plastic, in order to reduce friction and prevent metal to metal contact. As illustrated in FIGS. 6H and 6I, the bushing 609 also has a cable slot 610 formed therein. The cable slots 605, 610 are aligned so that a cable can pass therethrough. When the set screw 606 is tightened it causes the bushing 609 to flex inward and frictionally engage the hollow shaft 510 and thus prevent the forearm extension 600 from rotating about the hollow shaft 510. The hollow shaft 510 and the first female coupling 602 are held together by utilizing a screw 611 and a washer 612 (see FIG. 2).

The body 601 preferably has an inverted U-shape with a topwall 613 and two sidewalls 614 so that a cable can be hidden therein. Advantageously attached within the U-shaped body 601, and preferably on the topwall 613, is a cable holder 615 (see FIG. 2). The cable holder 615 secures a cable within the U-shaped body so that it can be hidden from view as it travels the length of the forearm extension 600.

The second female coupling 603 is for attachment to a device mounting, such as a tilter 700 described in Applicant's co-pending patent application Ser. No. 09/406,530 filed on Sep. 27, 1999 which is incorporated herein by reference in its entirety. Thus, the second female coupling 603 has an inner diameter 616 that is sized to rotatably engage a shaft of the device mount. A bushing 621 (see FIG. 2), preferably made of a smooth material such as plastic, is placed over the shaft and within the second female coupling 603. The second female coupling 603 preferably has a set screw 617 formed within a wall 618 of the second female coupling 603. When the set screw 617 is tightened it causes the bushing 617 to flex inward and frictionally engage the shaft and thus prevent the device mount from rotating around the second female coupling 603. Advantageously, the second female coupling 603 also has a plurality of voids 619 formed in the wall 618.

The forearm extension 600 illustrated in FIGS. 7A and 7B, has the topwall 620 flush with an upper edge of the female couplings 602, 603. Since the first female coupling 602 is larger than the second female coupling 603, the center of the first female coupling 602 is not aligned with the center of the second female coupling 603 or an axial centerline of the body 601. It should be noted that an alternative embodiment is to have the center of the female couplings 602, 603 and the axial centerline 621 of the body 601 all aligned, so that the topwall 620 would not be aligned with an upper edge of the first female coupling 602.

Referring back to FIG. 1, an electronic device such as a flat-screen monitor is attached to a device mounting, such as tilter which is rotatably coupled to the second female coupling 603. A cable, such as a power cable, proceeds from the electronic peripheral device to the underside of the body 601 of the forearm extension 600. The cable is held in place within the body 601 by the cable holder 615. The cable proceeds from the body through the cable slots 605, 610, in the bushing 609 and the first female coupling 602. The cable then proceeds through the hollow shaft 510 of the second endcap 500. The cable exits the second endcap 500 through the open end of the partially enclosed housing 501. The cable proceeds down the length of the lower channel 300 and exits at the first end 307 of the cable channel 306, while being hidden from view and substantially protected by the cable cover 325.

Typically, the cable is inserted into the lower channel 300 as portions of the lower channel 300 and upper channel 200 are being assembled. That is, the cable is placed under the body 601 of the forearm extension 600 and is held in place by the cable holder 615. The cable is then passed through the cable slots 605, 610. The cable including the plug is then fed through the hole 506 in the second endcap 500. The second endcap 500 is now assembled by inserting the mounting end 511 of each endcap adapter 509 into the hole 506, thus surrounding the cable. The endcap adapters 509 are held together and within the hole 506 by tightening the set screws 508. The hollow shaft 510 is then placed within the first female coupling 602. The cable is placed within the lower channel 300, prior to the lower channel 300 and the second endcap being secured together. This ensures that the cable is above the roller 302 and is contained within the hollow bar formed by the upper channel 200 and the lower channel 300.

Referring back to FIG. 2, several additional components of the extension arm 100 are typical. For aesthetic purposes, a bumper 650 may be placed on the second endwall 504 of the second endcap 500 and a plug 651 is generally placed over the first female coupling 602. A washer 652 is typically placed over the two endcap adapters 509 to help secure them together.

It has become increasingly apparent that additional innovations are necessary to make extension arms for electronic peripheral devices more cost effective. Extension arms according to the prior art have been manufactured utilizing members individual to specified stock lengths. Thus, if an end-user required an extension arm of a particular length different from that manufactured, it was either unavailable, or more costly because an entirely new arm assembly of the correct length would have to be manufactured. Additionally, if a manufacturer wished to provide arms of various lengths, he would be required to maintain an inventory of several different length components at a significant cost.

SUMMARY OF THE INVENTION

It is broadly an object of the present invention to provide an effective modular mounting arm for electronic peripheral devices such that the end user may specify a customized finished length.

In order to address this objective, this invention is directed to a support apparatus with arm members capable of being cut from a length of stock material to user specified dimensions. The benefit of this design is that the manufacturer is required only to keep one stock length of components on hand, rather than maintaining inventory of various length components. From those stock components, arms may then be cut and assembled to various lengths as specified by the end user.

In one embodiment of the present invention, the extension arm comprises modular upper and lower channels capable of being cut down from stock pieces to a user specified length.

Another embodiment of the present invention contemplates a modular forearm extension capable of being cut down from stock pieces to a user specified length.

In accordance with one embodiment of the present invention there is described an adjustable extension arm for mounting an electronic device thereto, the extension arm comprising a forearm extension having a first end and a second end for attachment of an electronic device thereto; a first endcap having a first end attachable to a support structure; a second endcap having a first end rotationally attached to the first end of the forearm extension; and elongated first and second channel members having first and second ends, the first and second channel members being nested together to form a channel therebetween, the first channel member comprising an elongated hollow member providing a first cavity extending therethrough, a first reinforcing member received within the first cavity and having first and second ends, and first and second roller units, the first roller unit including a first end coupled to the first end of the first reinforcing member and a second end pivotably coupled to the first end cap, the second roller unit including a first end coupled to the second end of the first reinforcing member and a second end pivotably coupled to the second end cap; the second channel member comprising an elongated hollow member providing a second cavity extending therethrough, a second reinforcing member received within the second cavity and having first and second ends, and third and fourth roller units, the third roller unit including a first end coupled to the first end of the second reinforcing member and a second end pivotably coupled to the first end cap, the fourth roller unit including a first end coupled to the second end of the second reinforcing member and a second end pivotably coupled to the second end cap.

In accordance with another embodiment of the present invention there is described an adjustable extension arm for mounting an electronic device thereto, the extension arm comprising a forearm extension including a hollow elongated body having a first end and a second end for attachment of an electronic device thereto; a first endcap having a first end attachable to a support structure; a second endcap having a first end rotationally attached to the first end of the forearm extension; and elongated first and second channel members having first and second ends, the first and second channel members being nested together to form a channel therebetween, the first channel member comprising an elongated hollow member providing a first cavity extending therethrough, a first reinforcing member received within the first cavity, and having first and second ends, and first and second roller units, the first roller unit including a first end coupled to the first end of the first reinforcing member and a second end pivotably coupled to the first end cap, the second roller unit including a first end coupled to the second end of the first reinforcing member and a second end pivotably coupled to the second end cap; the second channel member comprising an elongated hollow member providing a second cavity extending therethrough, a second reinforcing member received within the second cavity, and having first and second ends, and third and fourth roller units, the third roller unit including a first end coupled to the first end of the second reinforcing member and a second end pivotably coupled to the first end cap, the fourth roller unit including a first end coupled to the second end of the second reinforcing member and a second end pivotably coupled to the second end cap; the reinforcing members comprising hollow members having open ends, the first ends of the roller units comprising a projecting member received within a respective end of one of the reinforcing members, and the second ends of the roller units comprising a cylindrical member; the forearm extension including a first coupling attached to the first end of the body and a second coupling attached to the second end of the body, the first coupling including a first end having a bore therein adapted for pivotably mounting the forearm extension to the second end cap, and a second end attached within the first end of the body, the second coupling including a first end having a bore therein adapted for coupling an electronic device thereto, and a second end attached within the second end of the body.

In accordance with another embodiment of the present invention there is described a channel member for an adjustable extension arm, the channel member comprising an elongated hollow member providing a cavity extending therethrough, a reinforcing member having first and second ends received within the cavity, and first and second roller units, the first roller unit including a first end coupled to the first end of the reinforcing member and a second end adapted for coupling to a first end cap of an adjustable extension arm, the second roller unit including a first end coupled to the second end of the first reinforcing member and a second end adapted for coupling to a second end cap of an adjustable extension arm.

In accordance with another embodiment of the present invention there is described a forearm extension for an adjustable extension arm, the forearm extension comprising an elongated hollow body having first and second ends, a first coupling attached to the first end of the body and a second coupling attached to the second end of the body, the first coupling including a first end having a bore therein adapted for pivotably mounting the forearm extension to a second end cap of an adjustable extension arm and a second end attached within the first end of the body, the second coupling including a first end having a bore therein adapted for coupling an electronic device thereto and a second end attached within the second end of the body.

In accordance with another embodiment of the present invention there is described a method of making a channel member for an adjustable extension arm, the method comprising forming an elongated hollow member having a cavity extending therethrough, inserting a reinforcing member having first and second ends into the cavity, coupling one end of a first roller unit to the first end of the reinforcing member, and coupling one end of a second roller unit to the second end of the reinforcing member.

In accordance with another embodiment of the present invention there is described a method of making an adjustable extension arm for mounting an electronic device thereto, the method comprising forming a first channel member having a cavity extending therethrough, inserting a first reinforcing member having first and second ends into the cavity, coupling one end of a first roller unit to the first end of the first reinforcing member and coupling one end of a second roller unit to the second end of the first reinforcing member; forming a second channel member having a cavity extending therethrough, inserting a second reinforcing member having first and second ends into the cavity, coupling one end of a third roller unit to the first end of the second reinforcing member and coupling one end of a fourth roller unit to the second end of the second reinforcing member; nesting the first and second channel members together; pivotably attaching one common end of the first and second channel members to a first end cap; pivotably attaching the other common end of the first and second channel members to a second end cap; and pivotably attaching one end of the second end cap to a forearm extension.

BRIEF DESCRIPTION OF THE DRAWINGS

The above description, as well as further objects, features and advantages of the present invention, will be more fully understood with reference to the following detailed description of a modular mounting arm, when taken in conjunction with the accompanying drawings, wherein.

DETAILED DESCRIPTION

Figure 1:
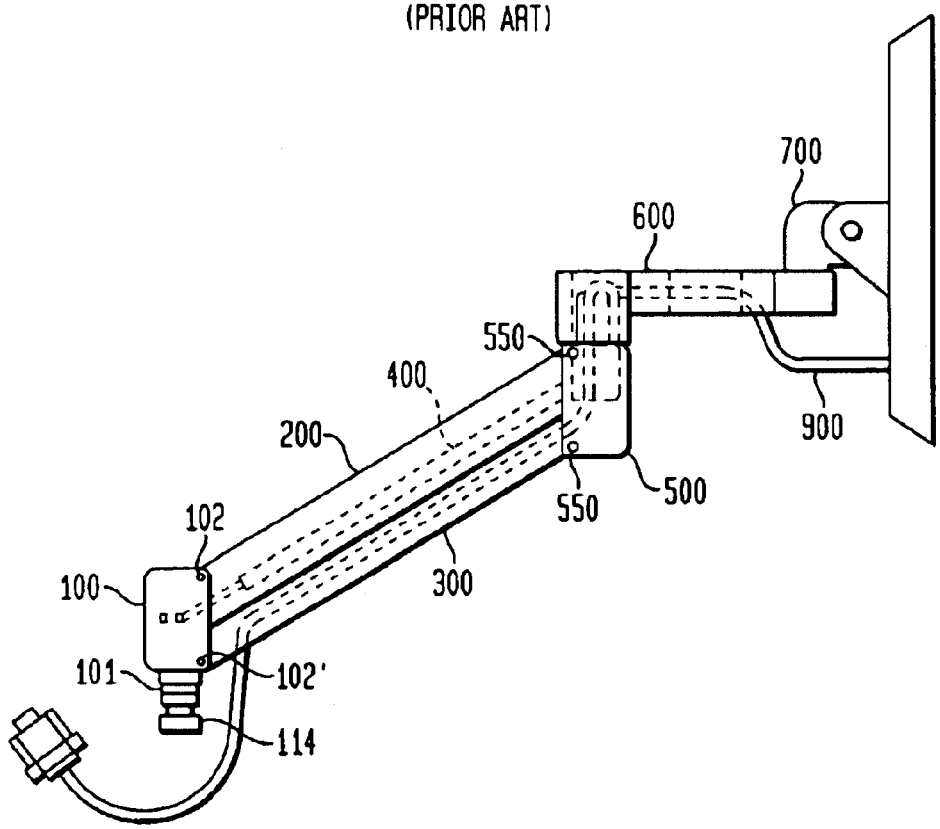
FIG. 1 is an assembly drawing in front elevation of an extension arm for mounting a computer monitor in accordance with the prior art.

In describing the preferred embodiments of the subject matter illustrated and to be described with respect to the drawings, specific terminology will be resorted to for the sake of clarity. However, the invention is not intended to be limited to the specific terms so selected, and is to be understood that each specific term includes all technical equivalence which operate in a similar manner to accomplish a similar purpose.

Referring to FIGS. 8A through 8F, there is illustrated an upper arm extension 250 constructed in accordance with one embodiment of the present invention. The upper arm extension 250 is constructed of an upper channel exterior member 253, a pair of roller units 251 and a reinforcing bar 252. The upper arm extension 250 can be constructed from a variety of metals, such as extruded aluminum which has the beneficial properties of both strength and light weight. The upper channel exterior member 253 is in the nature of a U-shaped member of indeterminate length. The upper channel exterior member 253 is capable of being cut from an indeterminate length to a user specified size and will therefore include a first end 262 and a second end 263. Accordingly, multiple upper channel exterior members 253 can be cut from a single extruded length of stock material.

The upper channel exterior fitting 253 includes two spaced apart sidewalls 255 and a transversally arranged top wall 254 therebetween, thus forming the U-shaped member. The sidewalls 255 may be tapered as previously described. Located on the interior surface of each sidewall 255 at positions equidistant below the top wall 254 are two projecting shelves 256. The shelves 256 generally extend between the first and second ends 262, 263 of the upper channel exterior member 253, such that they run through the entire length of the upper channel 250. The shelves 256 are situated such that an open cavity 259 is formed between the top wall 254, sidewalls 255 and the shelves. The cavity 259 is defined by cavity walls 261 and a cavity roof 260. At each end of the upper channel 250, a notch such as a circular region 264 can be cut out of the sidewalls 255 where it joins with topwall 254 to accommodate a portion of the roller units 251 in assembled relationship, as to be described hereinafter.

A reinforcing bar 252 of preferably tubular construction is slideably disposed or force fit within the cavity 259 along the length of the upper channel exterior member 253 between the first and second ends, 262, 263. The bar is sized in height and width such that its bottom surface 257 rests upon the shelves 256 while the top surface 258 generally contacts the cavity roof 260 and its side surfaces 263 generally contact the cavity walls 261 forming a rigid structure. The bar 252 is formed with a cavity 274 extending therethrough. Typically, the reinforcing bar 252 is formed from extruded steel or other suitable material to enhance and strengthen the upper channel 250 and is cut to a length dependent on, and generally equal to, the final length of the upper channel exterior member 253. Formed with the top and bottom surfaces 257, 258 of the reinforcing bar 252 at both ends are through holes 265. The holes 265 are preferably located near both of the first and second ends 262, 263 of the upper channel 250, and as illustrated, are typically elongated holes, although other shapes are contemplated.

Each roller unit 251 includes a rectangular member 266 of solid or tubular construction from extruded aluminum having a first end 269 and a second end 270, and a cylindrical member 267 also formed from aluminum. At the second end 270 of each rectangular member 266, an arcuate or semicircular region 268 may be formed. The cylindrical member 267 is welded transversally to a respective rectangular member 266 along the length of the top wall 271, bottom wall 272, and sidewalls 273 of the rectangular member. Each cylindrical member 267 has a cast or formed hole 205 extending therethrough such that it may be pivotally attached via pins 102, 550 to the first endcap 100 or second endcap 500. The roller unit 251 may also be formed as an integral one piece casting or machining and the like.

The rectangular member 266 is sized and shaped such that it may be snugly disposed longitudinally within the cavity 274 of the reinforcing bar 252. Provided through the top wall 271 and bottom wall 272 of the rectangular member 266 are aligned openings, for example, elongated holes 275. When the roller units 251 are properly slid within the reinforcing bar 252, the holes 265, 275 will have at least a common overlying portion in alignment with each other. By way of example, the holes 265, 275 may have the same size and shape. These overlying holes 265, 275 enable the reinforcing bar 252 and each roller unit 251 to be fixed in assembled position. Typically, the reinforcing bar is made of steel while the roller units 251 and upper channel 250 are made of aluminum. This material divergence prevents each element from being directly welded together.

Figure 8A:
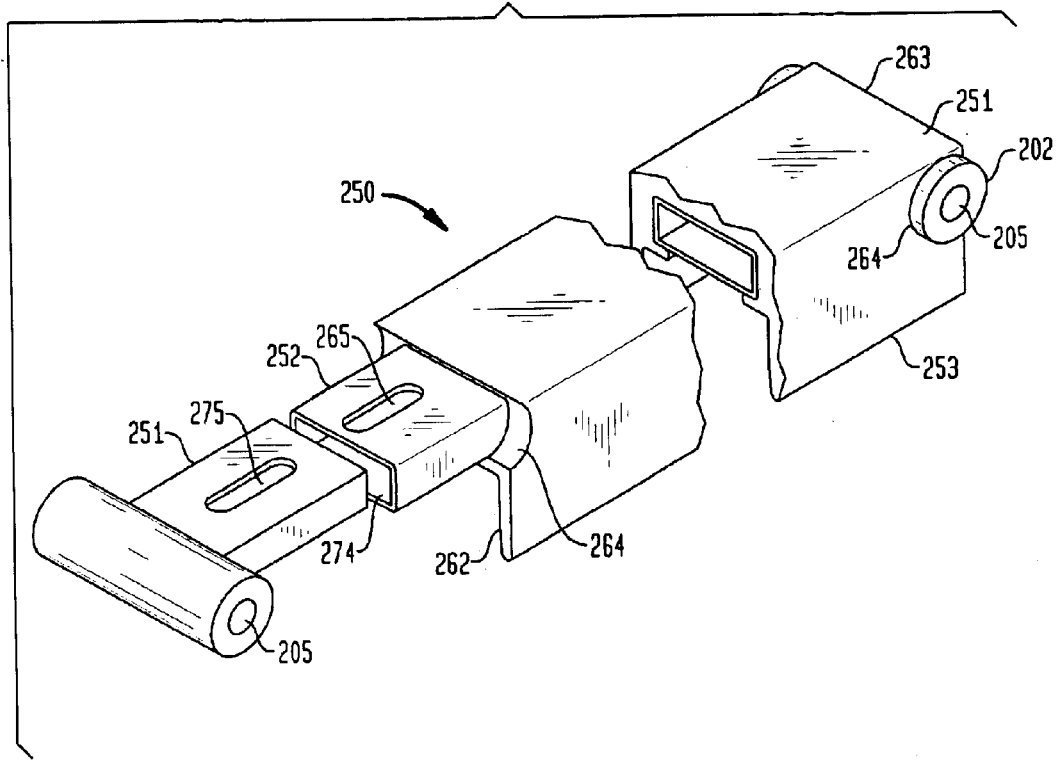
FIGS. 8A through 8G illustrate various views of the upper arm extension and components therefore forming the upper arm extension constructed in accordance with one embodiment of the present invention.
Figure 8B:
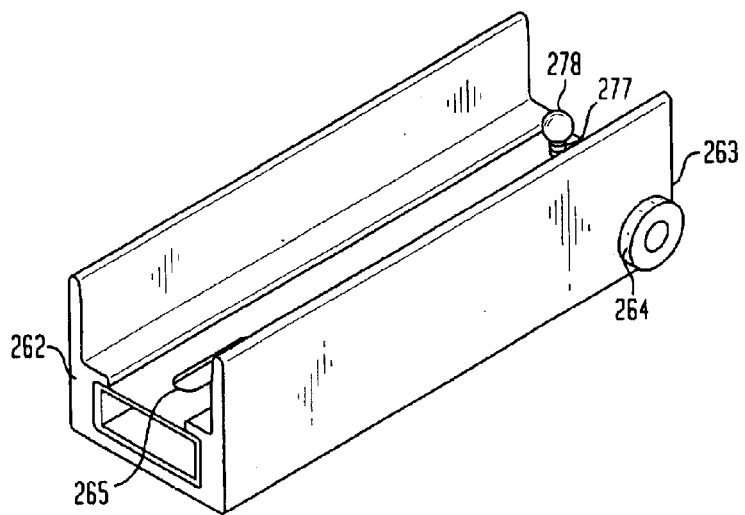
Figure 8C:
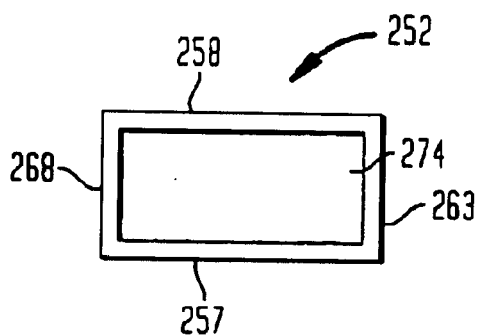
Figure 8D:
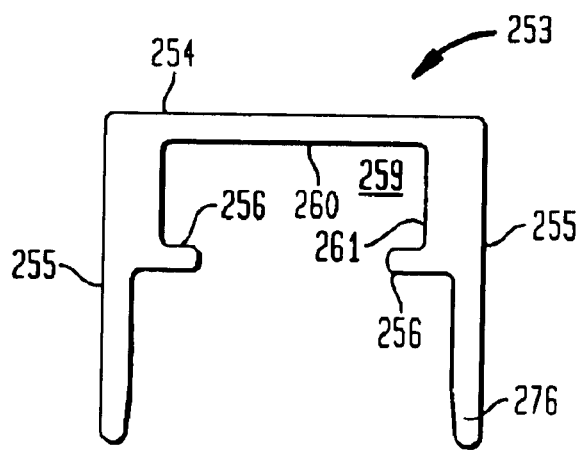
Figure 8E:
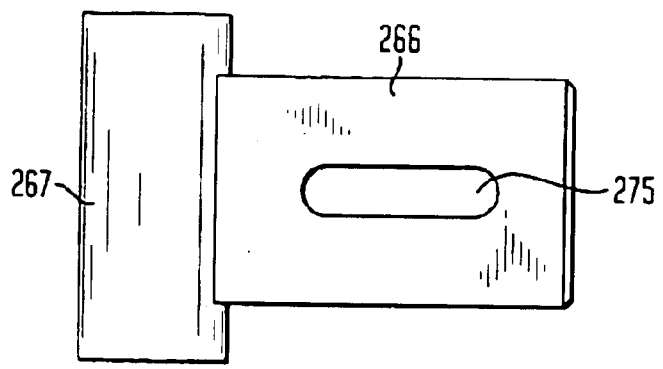
Figure 8F:
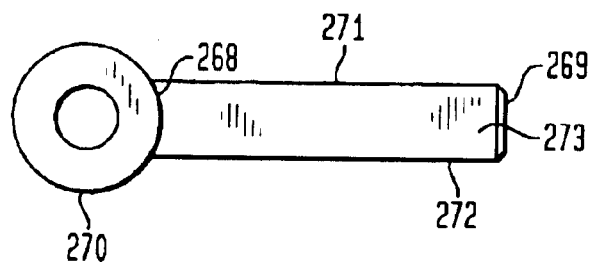
Figure 8G:
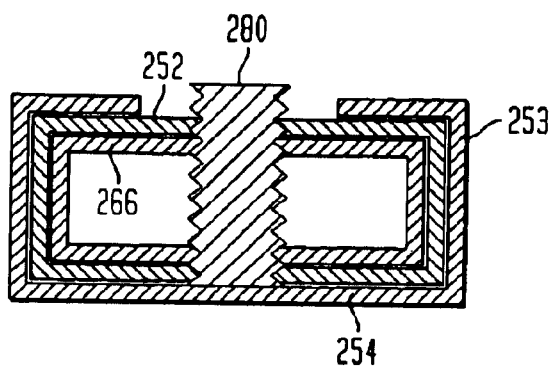

In one embodiment of the invention, aluminum material may be welded to the roof 260 of the top wall 254 of the upper channel exterior member 253 by filling the holes 265, 270 to form a rigid connection plug 280 as shown in FIG. 8G. In another embodiment, a pre-formed aluminum plug (not shown) suitably sized to fill the space within the two elongated holes 265, 275 may be inserted and bonded to the upper channel exterior member 253. In either case, the plug serves to lock the components together in assembled relationship, such that they may no longer slide relative to one another. In another embodiment, the roller units 251, reinforcing bar 252 and upper channel exterior member 253 may be chemically bonded, for example, with epoxy adhesive. Additionally, these components may be mechanically connected with, for example, screws or rivets or the like.

As previously described, each roller unit 251 is engaged with the upper channel's respective first end 262 and second end 263. At each first end 262 and second end 263, the cylindrical member 267 of each roller unit 251 abuts the upper channel. The abutment may either be directly against the first end 262 and second end 263 or may be within the notches, such as the circular region 264 expressly provided for this purpose. For illustrative purposes, FIG. 8B depicts a first end 262 with the standard abutment against a right angle corner and a second end 263 with the notched semicircular region 264, see also FIG. 8A. It is therefore contemplated that the ends of the reinforcing bar 252 will be similarly notched with a corresponding circular region to receive the cylindrical member 267.

Disposed adjacent the second end 263 of the upper channel 250 is a tapped hole 277 within the reinforcing member 252. The tapped hole is sized to accept a threaded end ball stud 278. The ball stud is configured and sized and threaded to receive the second end of the suspension device 400, as previously described in the prior art.

FIGS. 9A through 9F illustrate a lower arm extension 350 including a lower channel exterior member 363, a pair of roller units 351 and a reinforcing bar 352 constructed in a like manner as the upper arm extension 250 detailed above.

Figure 9A:
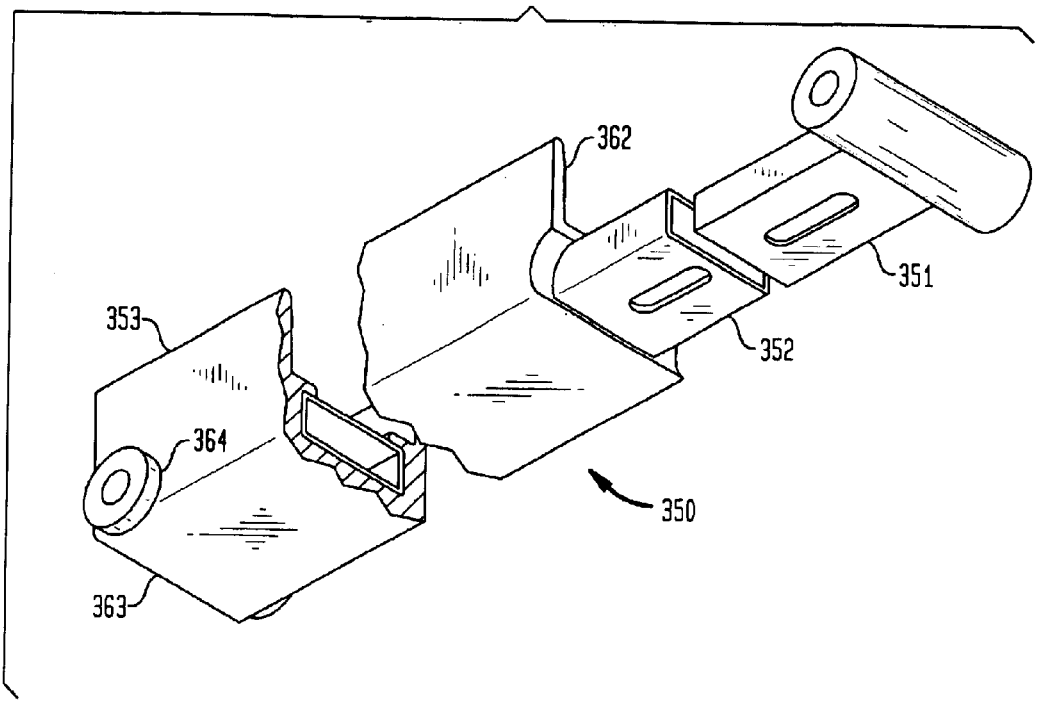
FIGS. 9A through 9F illustrate various views of the lower arm extension and components therefore forming the lower arm extension constructed in accordance with one embodiment of the present invention.
Figure 9B:
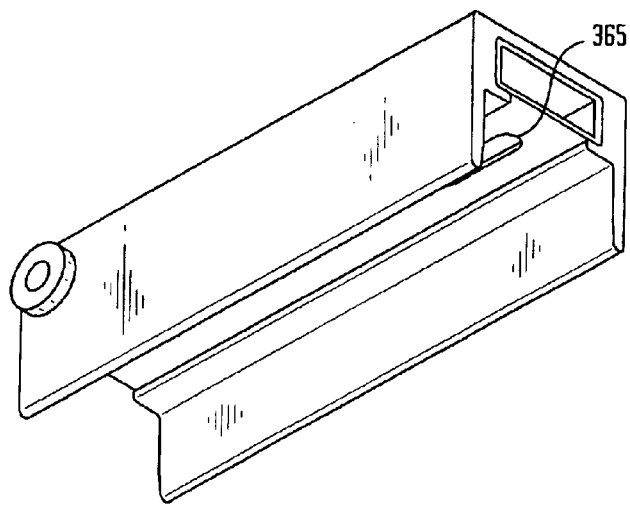
Figure 9C:
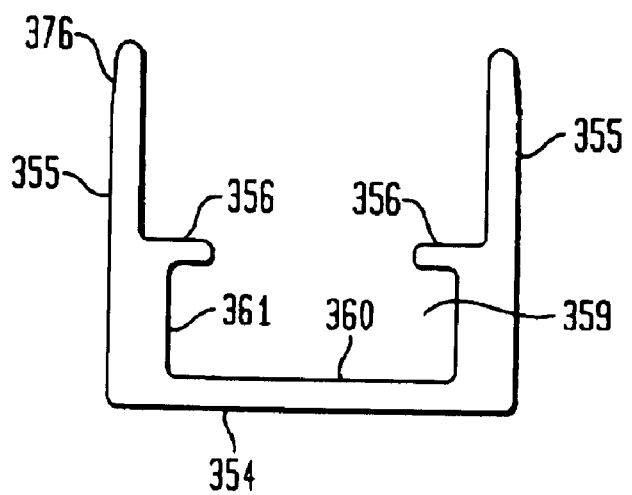
Figure 9D:
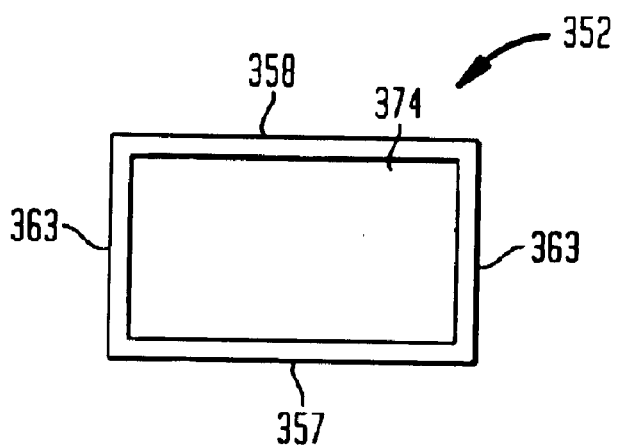
Figure 9E:
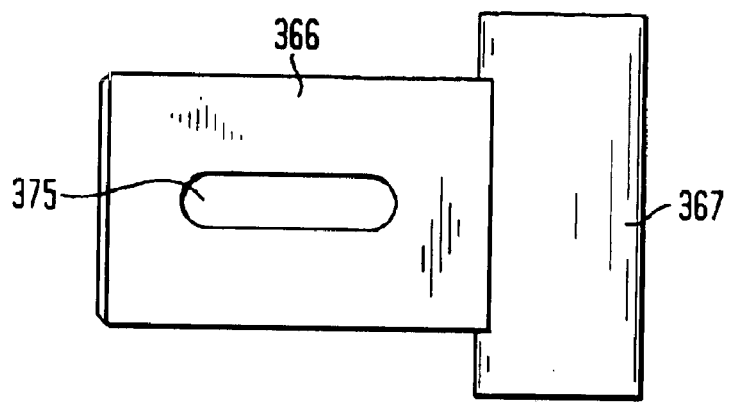
Figure 9F:
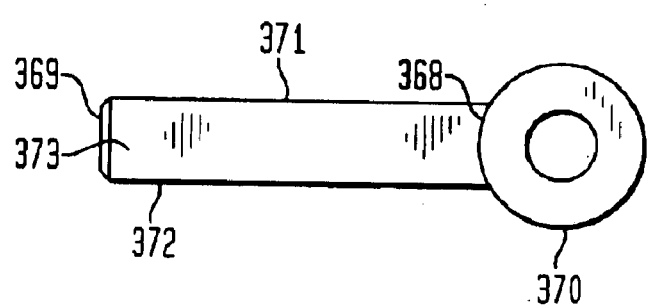

Referring to FIGS. 8D and 9C, each sidewall 255, 355 of the upper and lower channel 250, 350 may be slightly tapered inwardly, for example, by approximately ½ to 1 degree. The taper allows more clearance between the upper and lower channels 250, 350 when the upper and lower channels 250, 350 are brought together during usage. That is, the inner surface of the sidewalls 276 of the upper channel exterior member 253 being tapered by approximately ½ to 1 degree means that there is additional clearance for the exterior surface 376 of the lower channel exterior member 353, which can be similarly tapered, to fit there within. The addition clearance ensures that the upper channel 250 and lower channel 350 will not scrape together during usage.

Referring to FIGS. 10A through 10F, there is illustrated a forearm extension 650 constructed in accordance with one embodiment of the present invention. In this embodiment, the forearm extension 650 includes a first female coupling 651, elongated body 652 and second female coupling 653, each formed from aluminum or similar material. In one embodiment of the present embodiment, the body 652 is formed from extruded metal of indeterminate length, preferably aluminum, and may be cut or formed to a user specified length to achieve a forearm extension 650 of the required length when connected to the first female coupling 651 and the second female coupling 653. The first and second female couplings 651, 653 may be formed by casting machining and the like.

Figure 10A:
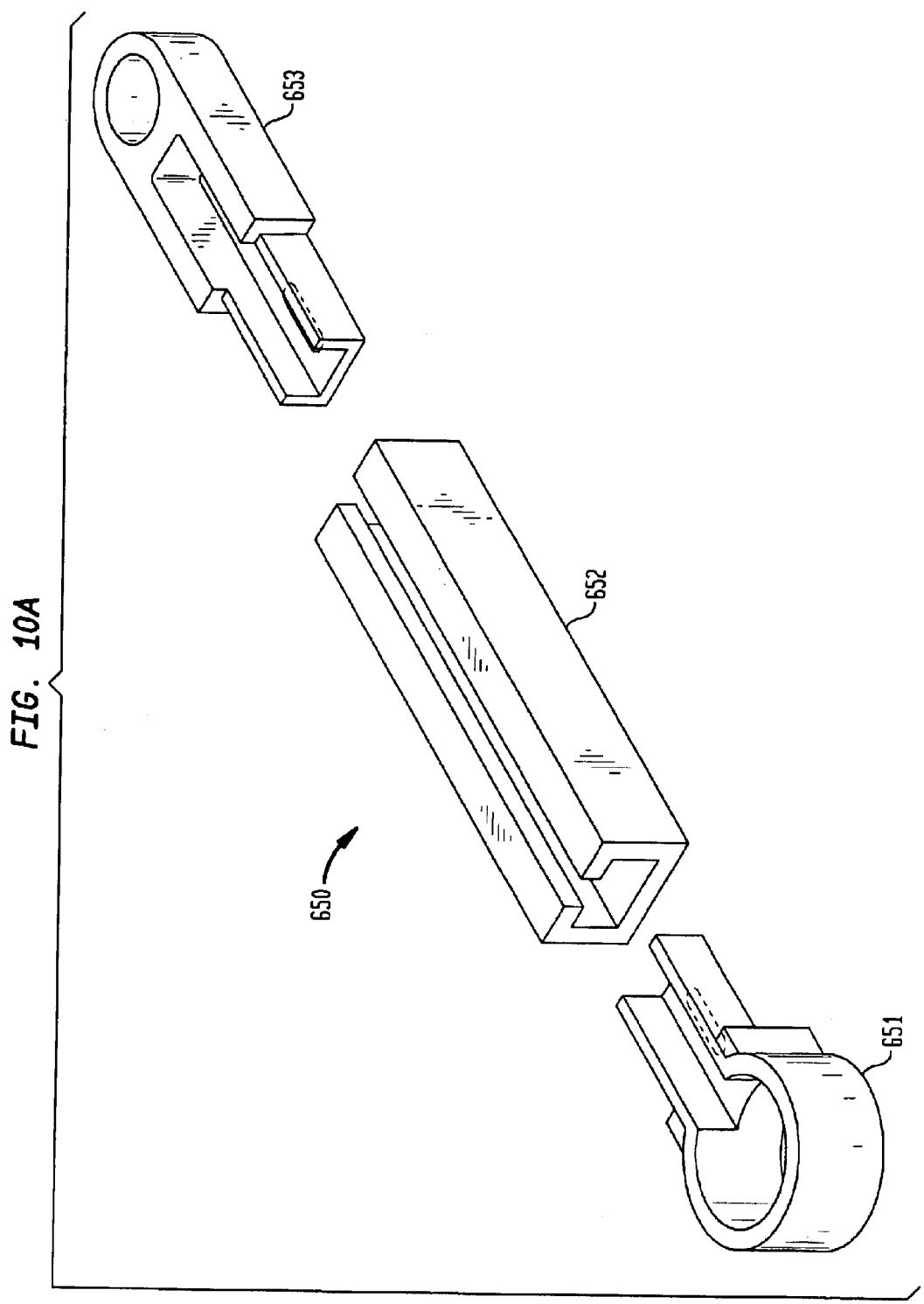
FIGS. 10A through 10F illustrate various views of the forearm extension and components therefore forming the forearm extension in accordance with one embodiment of the present invention.
Figure 10B:
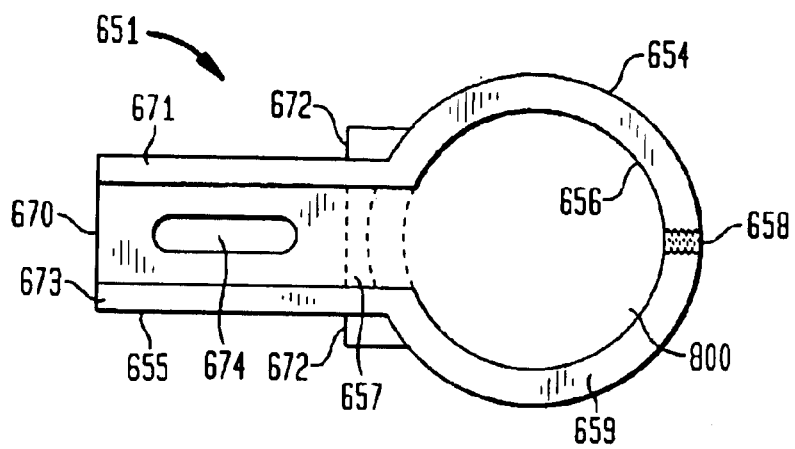

As shown in FIG. 10B, the first female coupling 651 includes a coupling end 654 and a shaft end 655. The coupling end 654 has a through bore 800 having an inner diameter 656 that is sized to rotatably engage the hollow shaft 510 of the second endcap 500. The first female coupling 651 is also configured to receive a cable through the hollow shaft 510. That is, the first female coupling 651 has a cable slot 657 formed therein during casting which communicates with the interior of the elongated body 652.

Figure 2:
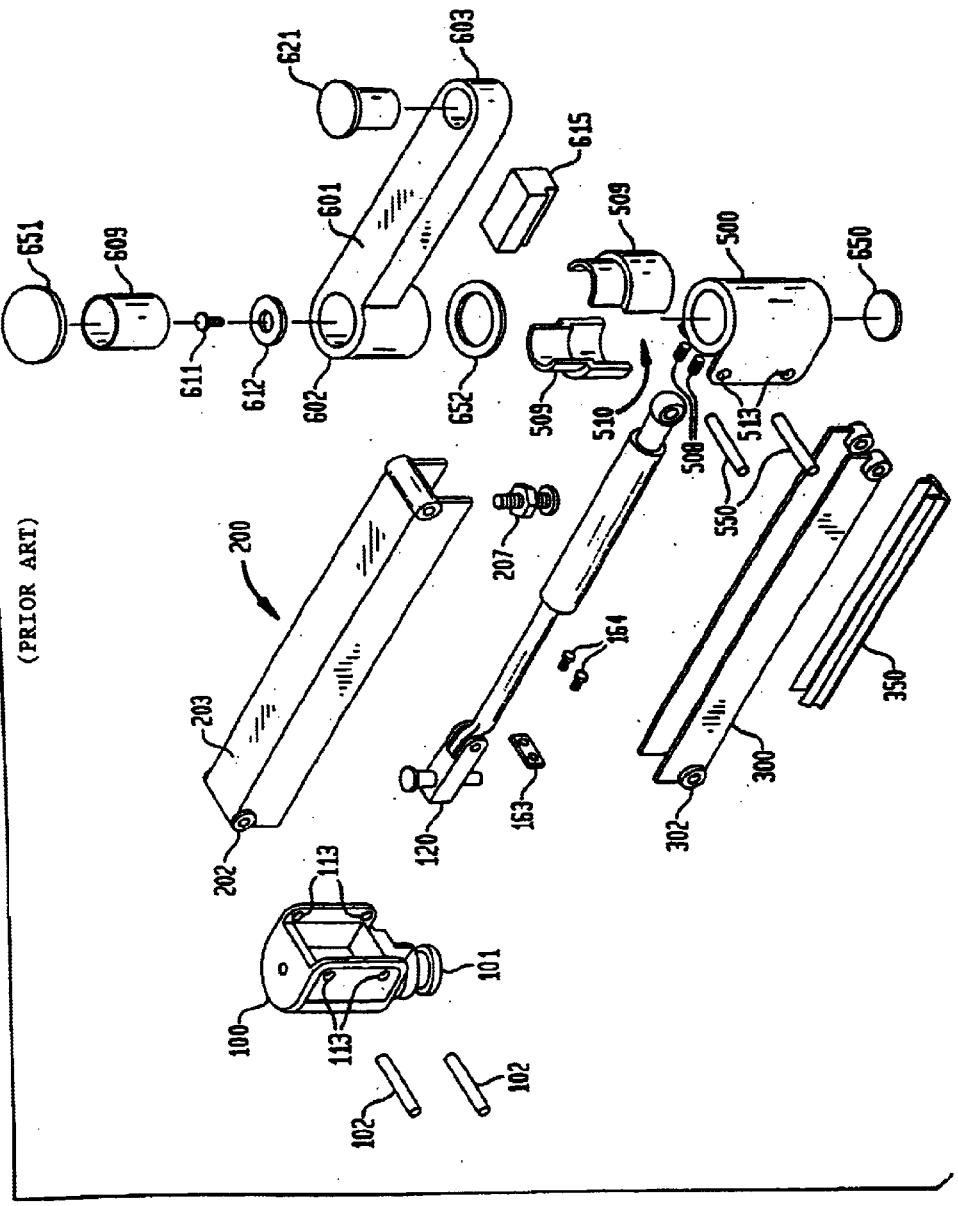
FIG. 2 is an exploded assembly drawing in perspective view of the extension arm in accordance with the prior art.
Figure 3A:
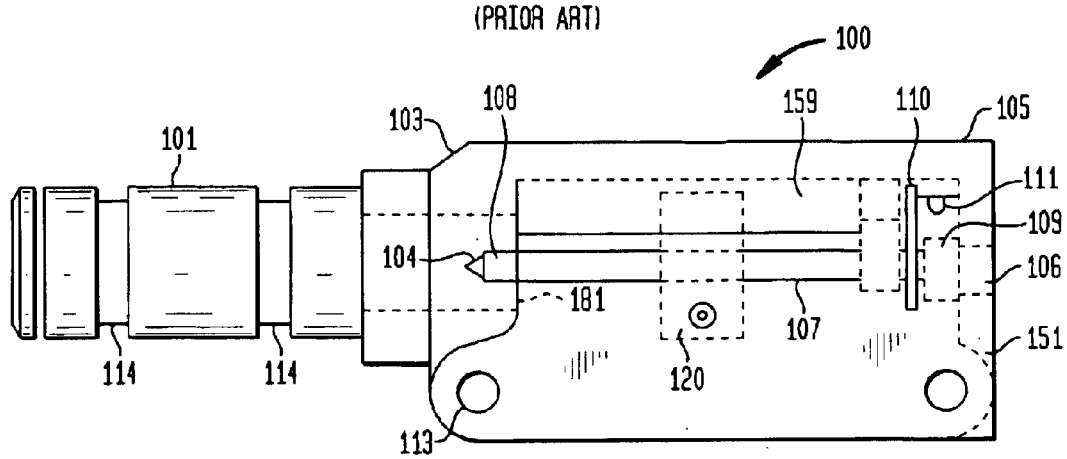
FIGS. 3A through 3E illustrate various views of the first endcap and the components forming the first endcap in accordance with the prior art.
Figure 3B:
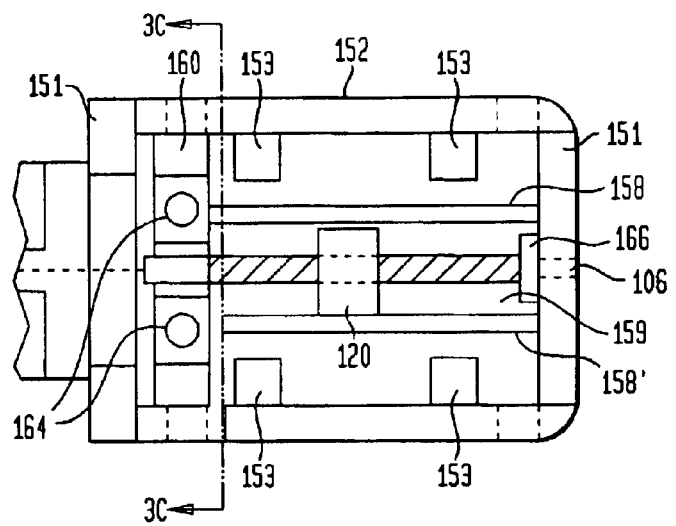
Figure 3C:
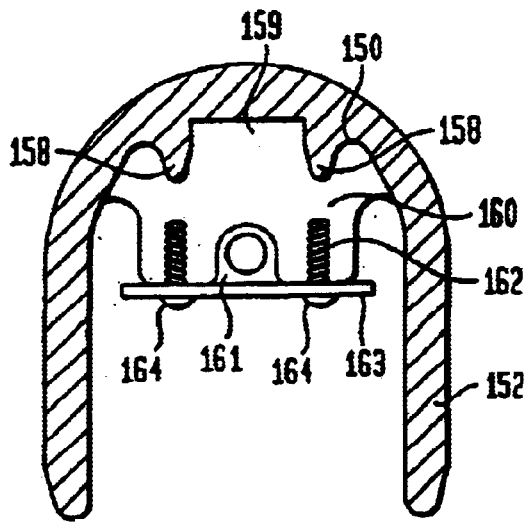
Figure 3D:
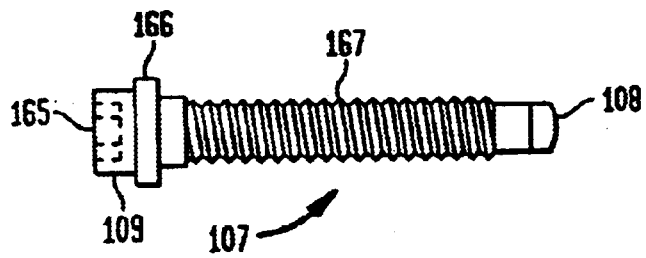
Figure 3E:
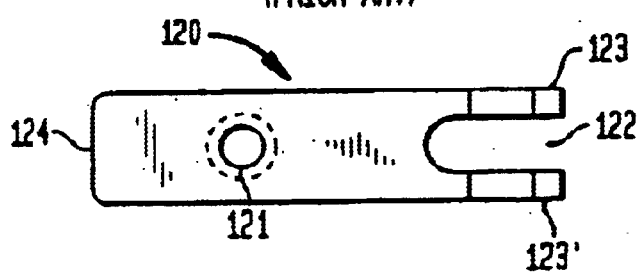
Figure 4A:
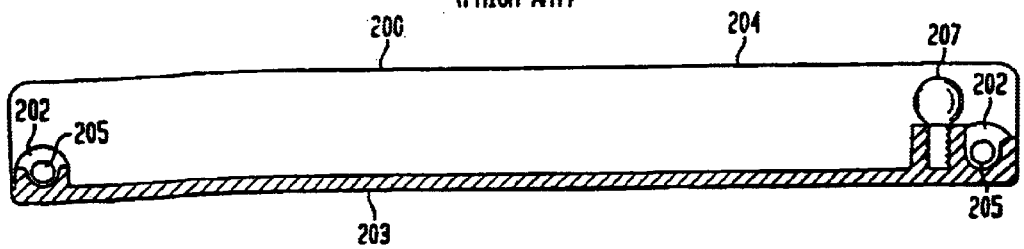
FIGS. 4A through 4D illustrate various views of the upper arm extension in accordance with the prior art.
Figure 4B:
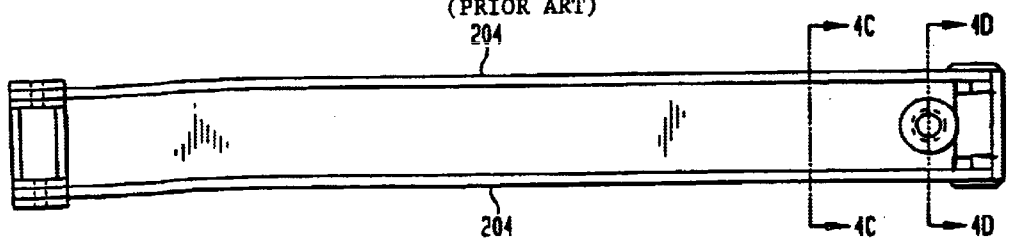
Figure 4C:
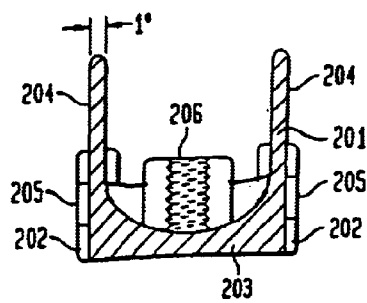
Figure 4D:
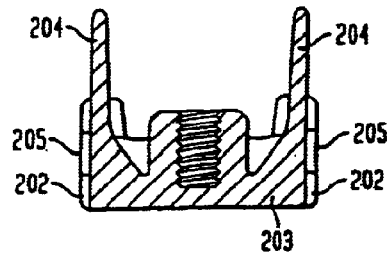
Figure 5A:
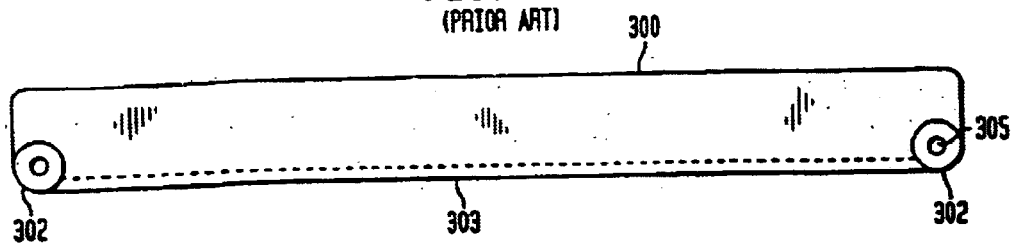
FIGS. 5A through 5E depict various views of the lower arm extension in accordance with the prior art.
Figure 5B:
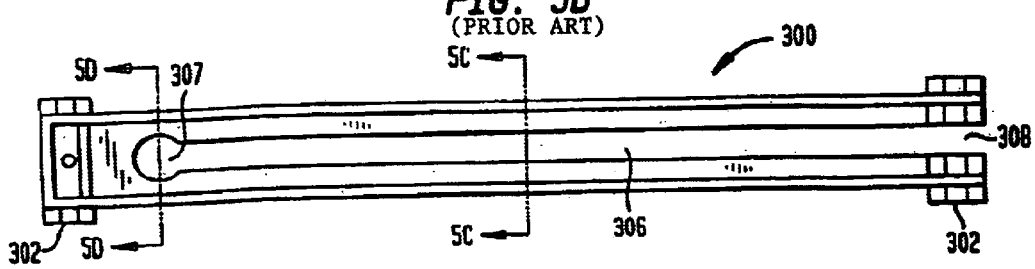
Figure 5C:
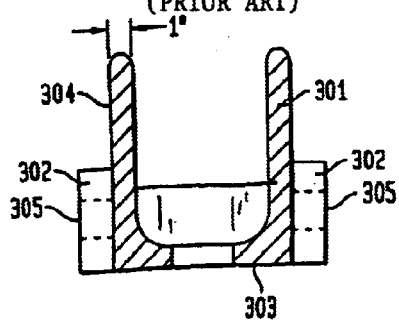
Figure 5D:
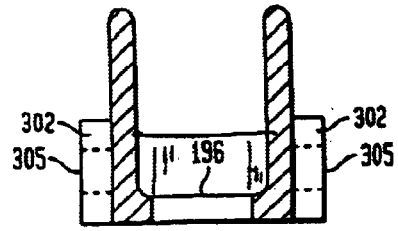
Figure 5E:
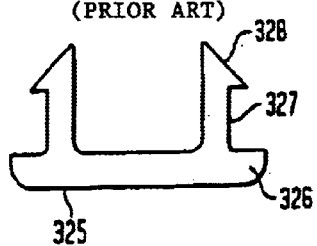
Figure 6A:
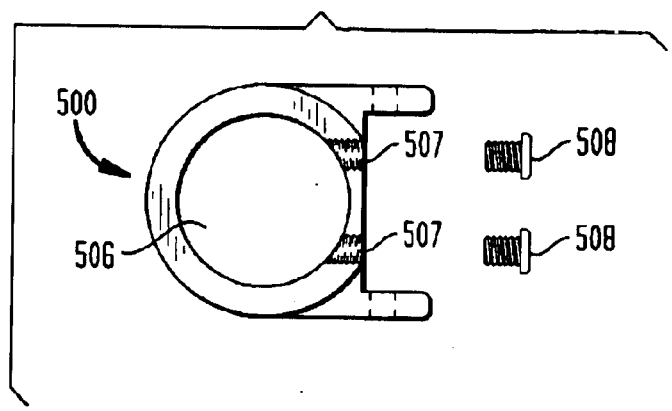
FIGS. 6A through 6I illustrate various views of the second endcap and the components forming the second endcap in accordance with the prior art.
Figure 6B:
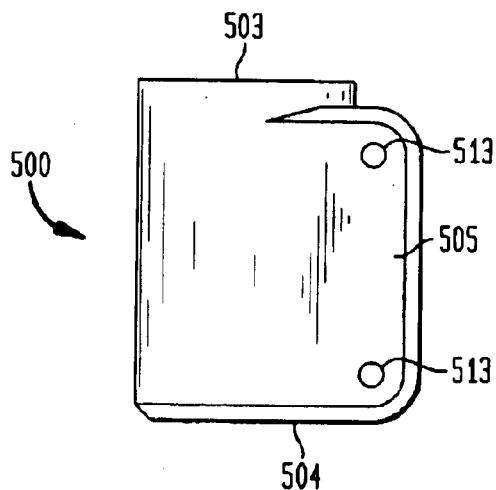
Figure 6C:
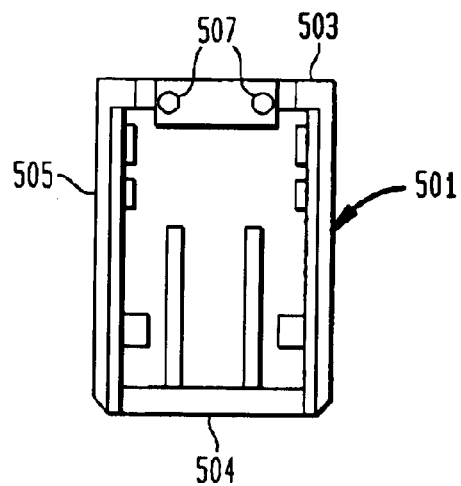
Figure 6D:
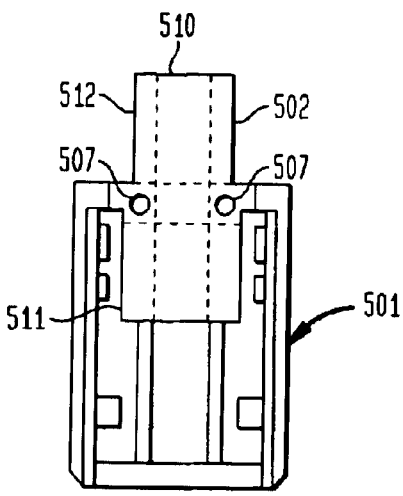
Figure 6E:
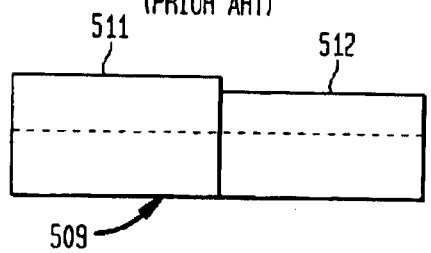
Figure 6F:
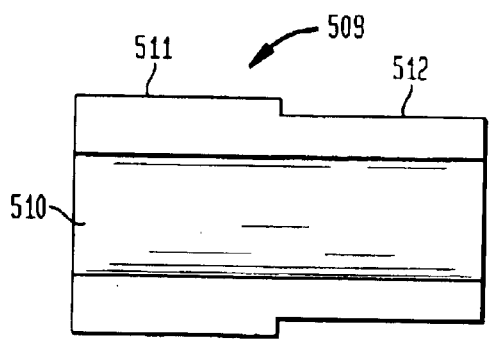
Figure 6G:
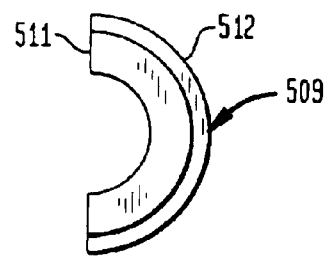
Figure 6H:
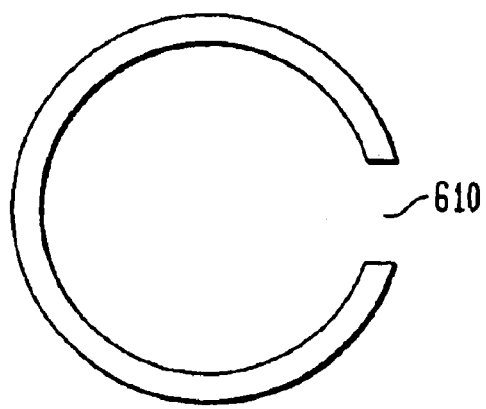
Figure 6I:
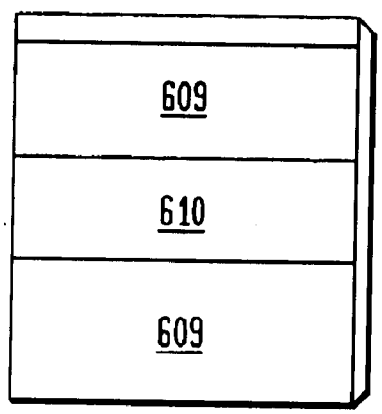
Figure 7A:
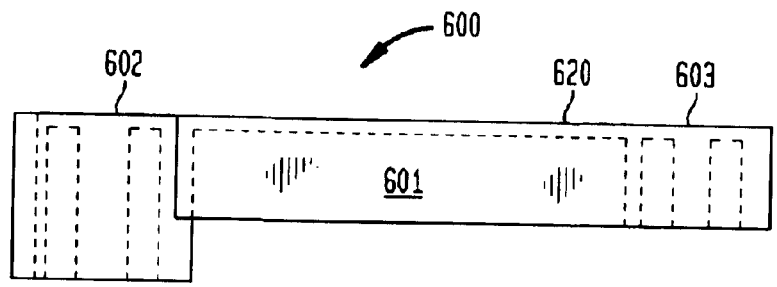
FIGS. 7A and 7B illustrate various views of the forearm extension in accordance with the prior art.
Figure 7B:
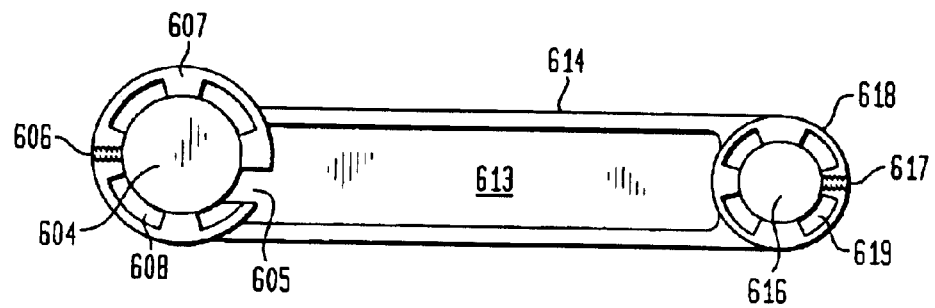

The first female coupling 651 generally has a threaded hole 658 to receive a set screw (not shown) formed within a wall 659 thereof. The set screw can be tightened to prevent the first female coupling 651 from rotating about the hollow shaft 510. A bushing 609 (see FIG. 2) is preferably used to engage the first female coupling 651 and the hollow shaft 510. That is, the bushing 609 is placed over the hollow shaft 510 and within the first female coupling 651. The bushing 609 is preferably made of a smooth material, such as plastic, in order to reduce friction and prevent metal to metal contact. As illustrated in FIG. 6H, the bushing 609 also has a cable slot 610 formed therein. The cable slots 605, 610 are aligned so that a cable can pass therethrough. When the set screw 658 is tightened it causes the bushing 609 to flex inward and frictionally engage the hollow shaft 510 and thus prevent the forearm extension 650 from rotating about the hollow shaft 510. The hollow shaft 510 and the first female coupling 651 are held together by utilizing a screw 611 and a washer 612 (see FIG. 2) threadably engaging a portion of the second endcap 500.

The shaft end 655 of the first female coupling 651 is constructed in a U-shaped configuration with a bottom wall 670 and two spaced apart sidewalls 671. Each sidewall 671 extends outwardly from the coupling end 654 of the first female coupling 651. Formed within the bottom wall is a void 674, such as an elongated hole.

Figure 10C:
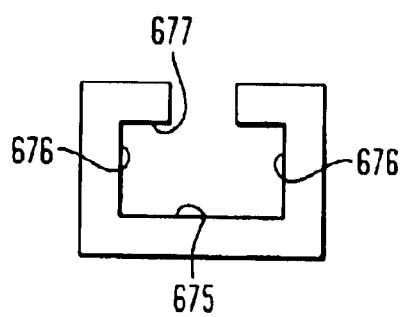
Figure 10D:
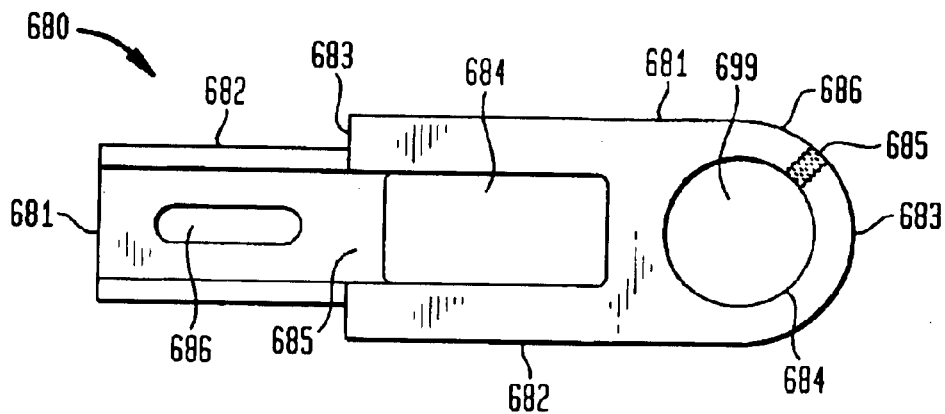
Figure 10E:
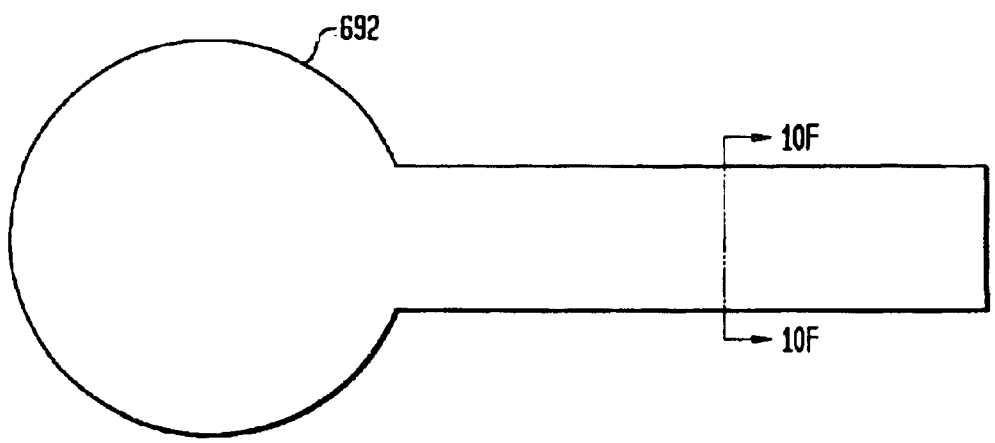
Figure 10F:
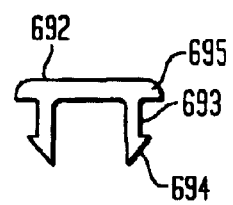

The shaft end 655 of the first female coupling 651 is sized and shaped such that it may be slideably engaged within the body 652 of the forearm extension 650. The body is configured as a lipped U-shaped member forming a hollow interior which is slightly larger than the shaft end 655 of the first female coupling 651 to accept same. Specifically, the body 652 as shown in FIG. 10C includes a bottom wall 675, spaced apart sidewalls 676 and a partially enclosed top wall 677 formed by inwardly extending lips. The body 652 and the first female coupling 651 are joined together such that the bottom wall 675 of the body slideably engages the bottom wall 670 of the shaft end 655 of the first female coupling; the inner surface of the sidewalls 676 of the body slideably engage the outer surfaces of the sidewalls 671 of the shaft end 655 of the first female coupling 651; and, the sidewall top surface 673 of the shaft end 655 of the first female coupling 651 slideably engages undersurface of the lips 677 of the body 652. The shaft end 655 is permitted to penetrate the body 652 until stops 672 disposed at the junction of the coupling end 654 and the shaft end 655 prevent further movement. The stops 672 are sized and positioned such that the void 674 of the shaft end 655 will align over the bottom wall 675 of the body 652. The first female coupling may be rigidly attached to the body 652 using similar means as that described for the upper channel exterior fittings 253 connection with the perspective roller units 251, including by means of a welded plug, preformed plug, chemical bonding, screw or rivet. The aforementioned engagement form an essentially rigid structure.

Slidably engaged into the opposite end of the body 652 in a similar manner is the second female coupling 653. The second female coupling 653 includes a shaft end 680 and a coupling end 681. The coupling end 681 comprises two spaced apart sidewalls 682 and a circular endwall 683 directly opposite the shaft end 680. Within the coupling end 681 is a through bore 699 having an inner diameter 684 for rotatably engaging a shaft of the tilter or similar device mount (not shown). A bushing 617 (see FIG. 2), preferably made of a smooth material such as plastic, is placed over the shaft and within the inner diameter 684 of the second female coupling 653. The second female coupling 653 preferably has a threaded hole to accept a set screw 685 formed within a wall 686 created by the inner diameter 684 and the semi-circular endwall 683. When the set screw 685 is tightened it causes the bushing 617 to flex inward and frictionally engage the shaft and thus prevent the device mount from rotating around the second female coupling 653.

Formed within the coupling end 681 of the second female coupling 653 is a cable opening 684. The opening is suitably sized such that the device cable and plug may be placed therethrough. Following placement through the cable opening, the cable and plug may then be placed through the cable slot 685, the body 652, and the first female coupling 651, as previously described.

The shaft end 680 of the second female coupling 653 is shaped and dimensioned such that it may be slideably engaged within the opposite end of the body 652 of the forearm extension 650 as the first female coupling 651. As such, the shaft end 680 of the second female coupling 653 is cast in a U-shaped configuration with a bottom wall 681 and two spaced apart sidewalls 682. Each sidewall 682 extends outwardly from a stop 683 formed with the coupling end 681 of the second female coupling 653. Formed within the bottom wall 681 is a void 687, such as an elongated hole 686. The void 686 is utilized in a similar manner as that of the first female coupling void 674 to form an essentially rigid structure with the body 652.

Figure 11:
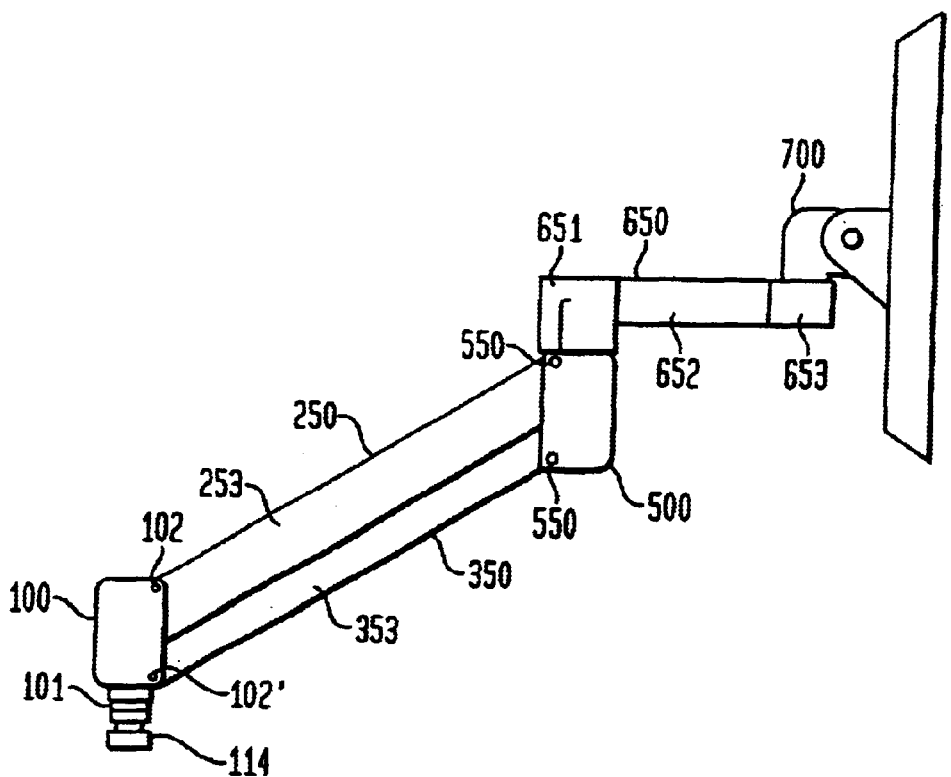
FIG. 11 is an assembled view of an extension an constructed in accordance with the present invention.

A cable cover 692 is typically affixed upon the first female coupling 651, body 652, and second female coupling 653. The cover is molded from plastic and contains a top cover 695 with a pair of sidewalls extending therefrom. The cable cover is shaped and sized such that the top cover 695 rests upon the first female coupling, body 652 and second female coupling 653. As such, at the first female coupling 651, the cover is circular in shape. Similarly, the extending sidewalls 693 are semi-circular in shape and extend into the inner diameter 656. The sidewalls 693 are suitably flexible such that stops 694 attached thereto engage the inner diameter 656 with sufficient pressure to prevent the cover from being released without an intent to do so. The portion of the cover 692 affixed to the shaft end 655 of the first female coupling 651, the body 652, and the second female coupling 653 is rectangular corresponding to the shape of those elements. This portion of the cable cover 692 may be cut to a corresponding length to that of the specified forearm extension 600. An assembled extension arm constructed in accordance with the present invention as thus far described is shown in FIG. 11.

Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. An adjustable extension arm for mounting an electronic device thereto, said extension arm comprising a forearm extension having a first end and a second end for attachment of an electronic device thereto; a first endcap having a first end attachable to a support structure; a second endcap having a first end rotationally attached to said first end of said forearm extension; and elongated first and second channel members having first and second ends, said first and second channel members being nested together to form a channel therebetween, said first channel member comprising an elongated hollow member providing a first cavity extending therethrough, a first reinforcing member fixedly secured within said first cavity and having first and second ends, and first and second roller units, said first roller unit including a first end coupled to said first end of said first reinforcing member and a second end pivotably coupled to said first end cap, said second roller unit including a first end coupled to said second end of said first reinforcing member and a second end pivotably coupled to said second end cap; said second channel member comprising an elongated hollow member providing a second cavity extending therethrough, a second reinforcing member fixedly secured within said second cavity and having first and second ends, and third and fourth roller units, said third roller unit including a first end coupled to said first end of said second reinforcing member and a second end pivotably coupled to said first end cap, said fourth roller unit including a first end coupled to said second end of said second reinforcing member and a second end pivotably coupled to said second end cap.

2. The extension arm of claim 1, wherein said forearm extension includes a first opening at said first end and a second opening adjacent said second end, said first and second openings in communication with each other through a channel provided within said forearm extension between said first and second ends, and said second endcap having an opening extending therethrough in communication with said first opening within said forearm extension.

3. The extension arm of claim 1, wherein said reinforcing members comprise hollow members having open ends, said first ends of said roller units comprising a projecting member received within a respective open end of one of said reinforcing members, and said second ends of said roller units comprising a cylindrical member.

4. The extension arm of claim 3, wherein said first and second reinforcing members each include a top wall and a bottom wall, said top wall including a first void adjacent the first and second ends of said reinforcing members, said bottom wall including a second void adjacent the first and second ends of said reinforcing members in respective alignment with said first voids, said projecting members of said roller units each including a third void in respective alignment with said first and second voids within said top and bottom walls of said reinforcing members, and a fastener within said aligned first, second and third voids securing said roller units to said first and second channel members.

5. The extension arm of claim 4, wherein said fastener comprises a mass of aluminum material adhered to said first and second channel member and said projecting members of said roller units.

6. The extension arm of claim 1, wherein said forearm extension comprises an elongated hollow body having first and second ends, a first coupling attached to said first end of said body and a second coupling attached to said second end of said body.

7. The extension arm of claim 6, wherein said first coupling includes a first end having a bore therein adapted for pivotably mounting said forearm extension to said second end cap, and a second end attached within the first end of said body.

8. The extension arm of claim 7, wherein said second coupling includes a first end having a bore therein adapted for coupling an electronic device thereto, and a second end attached within the second end of said body.

9. The extension arm of claim 8, wherein said second ends of said first and second couplings comprise U-shaped members.

10. The extension arm of claim 8, wherein said first and second coupling each include a stop member limiting the extent of engagement of said second ends of said couplings within said first ends of said body.

11. An adjustable extension arm for mounting an electronic device thereto, said extension arm comprising a forearm extension including a hollow elongated body having a first end and a second end for attachment of an electronic device thereto; a first endcap having a first end attachable to a support structure; a second endcap having a first end rotationally attached to said first end of said forearm extension; and elongated first and second channel members having first and second ends, said first and second channel members being nested together to form a channel therebetween, said first channel member comprising an elongated hollow member providing a first cavity extending therethrough, a first reinforcing member fixedly secured within said first cavity, and having first and second ends, and first and second roller units, said first roller unit including a first end coupled to said first end of said first reinforcing member and a second end pivotably coupled to said first end cap, said second roller unit including a first end coupled to said second end of said first reinforcing member and a second end pivotably coupled to said second end cap; said second channel member comprising an elongated hollow member providing a second cavity extending therethrough, a second reinforcing member fixedly secured within said second cavity, and having first and second ends, and third and fourth roller units, said third roller unit including a first end coupled to said first end of said second reinforcing member and a second end pivotably coupled to said first end cap, said fourth roller unit including a first end coupled to said second end of said second reinforcing member and a second end pivotably coupled to said second end cap; said reinforcing members comprising hollow members having open ends, said first ends of said roller units comprising a projecting member received within a respective end of one of said reinforcing members, and said second ends of said roller units comprising a cylindrical member; said forearm extension including a first coupling attached to said first end of said body and a second coupling attached to said second end of said body, said first coupling including a first end having a bore therein adapted for pivotably mounting said forearm extension to said second end cap, and a second end attached within the first end of said body, said second coupling including a first end having a bore therein adapted for coupling an electronic device thereto, and a second end attached within the second end of said body.

12. The extension arm of claim 11, wherein said first and second reinforcing members each include a top wall and a bottom wall, said top wall including a first void adjacent the first and second ends of said reinforcing members, said bottom wall including a second void adjacent the first and second ends of said reinforcing members in respective alignment with said first voids, said projecting members of said roller units each including a third void in respective alignment with said first and second voids within said top and bottom walls of said reinforcing members, and a fastener within said aligned first, second and third voids securing said roller units to said first and second channel members.

13. The extension arm of claim 12, wherein said fastener comprises a mass of aluminum material adhered to said first and second channel member and said projecting members of said roller units.

14. A channel member for an adjustable extension arm, said channel member comprising an elongated hollow member providing a cavity extending therethrough, a reinforcing member having first and second ends fixedly secured within said cavity, and first and second roller units, said first roller unit including a first end coupled to said first end of said reinforcing member and a second end adapted for coupling to a first end cap of an adjustable extension arm, said second roller unit including a first end coupled to said second end of said first reinforcing member and a second end adapted for coupling to a second end cap of an adjustable extension arm.

15. The channel member of claim 14, wherein said reinforcing member comprises a hollow member having open ends, said first ends of said roller units comprising a projecting member received within a respective open end of said reinforcing member, and said second ends of said roller units comprising a cylindrical member.

16. The channel member of claim 15, wherein said reinforcing member includes a top wall and a bottom wall, said top wall including a first void adjacent the first and second ends of said reinforcing member, said bottom wall including a second void adjacent the first and second ends of said reinforcing member in respective alignment with said first voids, said projecting member of said roller units each including a third void in respective alignment with said first and second voids within said top and bottom walls of said reinforcing member, and a fastener within said aligned first, second and third voids securing said roller units to said channel member.

17. The channel member of claim 16, wherein said fastener comprises a mass of aluminum material adhered to said channel member and said projecting members of said roller units.

18. The channel member of claim 14, wherein said elongated hollow member has a U-shaped cross-section.

19. The channel member of claim 14, wherein said hollow member includes a pair of spaced sidewalls connected by a top wall and opposing shelves inwardly projecting from said sidewalls, said sidewalls, said shelves and said top wall defining said cavity.

20. A forearm extension for an adjustable extension arm, said, forearm extension comprising an elongated hollow body having an inner surface and first and second ends, a first coupling fixedly attached to said first end of said body and a second coupling fixedly attached to said second end of said body, said first coupling including a first end having a bore therein adapted for pivotably mounting said forearm extension to a second end cap of an adjustable extension arm and a second end attached within the first end of said body, said second coupling including a first end having a bore therein adapted for coupling an electronic device thereto and a second end attached within the second end of said body wherein the second ends of said first and second couplings include a void, exposing a portion of said inner.

21. The forearm extension of claim 20, wherein said second ends of said first and second couplings comprise U-shaped members.

22. The forearm extension of claim 20, wherein said first and second couplings each include a stop member limiting the extent of engagement of said second ends of said couplings within said first ends of said body.

23. The forearm extension of claim 20, further including a mass of aluminum material adhered to an inner surface of said hollow body within said void.

24. A method of making a channel member for an adjustable extension arm, said method comprising forming an elongated hollow member having a cavity extending therethrough, fixedly securing a reinforcing member having first and second ends within said cavity, coupling one end of a first roller unit to said first end of said reinforcing member, and coupling one end of a second roller unit to said second end of said reinforcing member.

25. The method of claim 24, further including forming said first and second ends of said reinforcing member with first and second respective voids, forming said one end of said first roller unit with a third void and said one end of said second roller unit with a fourth void, aligning said first and second voids with a corresponding one of said third and fourth voids.

26. The method of claim 25, securing said first and second roller units to said channel member by filling the aligned voids with aluminum material.

27. The method of claim 24, forming said first and second roller units with another end in the form of a cylindrical member.

28. The method of claim 24, wherein said first and second ends of said reinforcing member comprises open ends, and wherein said coupling step comprises inserting said one end of said first and second roller units into a respective one of said open ends.

29. The method of claim 24, wherein said elongated hollow member has a predetermined length by severing a portion forming said elongated member from an elongated hollow member of greater length.

30. A method of making an adjustable extension arm for mounting an electronic device thereto, said method comprising forming a first channel member having a cavity extending therethrough, fixedly securing a first reinforcing member having first and second ends within said cavity, coupling one end of a first roller unit to said first end of said first reinforcing member and coupling one end of a second roller unit to said second end of said first reinforcing member; forming a second channel member having a cavity extending therethrough, fixedly securing a second reinforcing member having first and second ends within said cavity, coupling one end of a third roller unit to said first end of said second reinforcing member and coupling one end of a fourth roller unit to said second end of said second reinforcing member; nesting said first and second channel members together; pivotably attaching one common end of said first and second channel members to a first end cap; pivotably attaching the other common end of said first and second channel members to a second end cap; and pivotably attaching one end of said second end cap to a forearm extension.

31. The method of claim 30, wherein said first channel member has a predetermined length by severing a portion forming said first channel member from an elongated channel member of greater length.

32. The method of claim 31, wherein said second channel member has a predetermined length by severing a portion forming said second channel member from an elongated channel member of greater length.

33. The method of claim 30, further including forming said first and second ends of said first reinforcing member with first and second respective voids; forming said one end of said first roller unit with a third void and said one end of said second roller unit with a fourth void, aligning said first and second voids with a corresponding one of said third and fourth voids.

34. The method of claim 33, further including forming said first and second ends of said second reinforcing member with first and second respective voids, forming said one end of said third roller unit with a third void and said one end of said fourth roller unit with a fourth void, aligning said first and second voids of said second reinforcing member with a corresponding one of said third and fourth voids.

35. The method of claim 33, further including securing said first and second roller units to said channel member by filling the aligned voids with aluminum material.

36. The method of claim 30, further including forming said first and second roller units with another end in the form of a cylindrical member.

37. The method of claim 30, wherein said first and second ends of said reinforcing member comprises open ends, and wherein said coupling step comprises inserting said one end of said first, second, third and fourth roller units into a respective one of said open ends.

38. An adjustable extension arm for mounting an electronic device thereto, said extension arm comprising a first endcap having a first end attachable to a support structure; a second endcap; and elongated first and second channel members having first and second ends, said first and second channel members being nested together to form a channel therebetween, said first channel member comprising an elongated hollow member providing a first cavity extending therethrough, a first reinforcing member fixedly secured within said first cavity and having first and second ends, and first and second roller units, said first roller unit including a first end fixedly coupled to said first end of said first reinforcing member and a second end pivotably coupled to said first end cap, said second roller unit including a first end fixedly coupled to said second end of said first reinforcing member and a second end pivotably coupled to said second end cap; said second channel member comprising an elongated hollow member providing a second cavity extending therethrough, a second reinforcing member fixedly secured within said second cavity and having first and second ends, and third and fourth roller units, said third roller unit including a first end fixedly coupled to said first end of said second reinforcing member and a second end pivotably coupled to said first end cap, said fourth roller unit including a first end fixedly coupled to said second end of said second reinforcing member and a second end pivotably coupled to said second end cap.

39. The extension arm of claim 38, wherein said reinforcing members comprise hollow members having open ends, said first ends of said roller units comprising a projecting member fixedly secured within a respective open end of one of said reinforcing members, and said second ends of said roller units comprising a cylindrical member.

40. The extension arm of claim 39, wherein said first and second reinforcing members each include a top wall and a bottom wall, said top wall including a first void adjacent the first and second ends of said reinforcing members, said bottom wall including a second void adjacent the first and second ends of said reinforcing members in respective alignment with said first voids, said projecting members of said roller units each including a third void in respective alignment with said first and second voids within said top and bottom walls of said reinforcing members, and a fastener within said aligned first, second and third voids fixedly securing said roller units to said first and second channel members.

41. A channel member for an adjustable extension arm, said channel member comprising an elongated hollow member providing a cavity extending therethrough, an elongated reinforcing member having first and second ends fixedly secured within said cavity, and first and second roller units, said first roller unit including a first end fixedly attached to said first end of said reinforcing member and a second end adapted for coupling to a first end cap of an adjustable extension arm, said second roller unit including a first end fixedly attached to said second end of said first reinforcing member and a second end adapted for coupling to a second end cap of an adjustable extension arm.

42. The channel member of claim 41, wherein said reinforcing member comprises a hollow member having open ends, said first ends of said roller units comprising a projecting member secured within a respective open end of said reinforcing member, and said second ends of said roller nits comprising a cylindrical member.

43. The channel member of claim 42, wherein said reinforcing member includes a top wall and a bottom wall, said top wall including a first void adjacent the first and second ends of said reinforcing member, said bottom wall including a second void adjacent the first and second ends of said reinforcing member in respective alignment with said first voids, said projecting member of said roller units each including a third void in respective alignment with said first and second voids within said top and bottom walls of said reinforcing member, and a fastener within said aligned first, second and third voids fixedly said roller units to said channel member.

44. The channel member of claim 41, wherein said hollow member includes a pair of spaced sidewalls connected by a top wall and opposing shelves inwardly projecting from said sidewalls, said sidewalls, said shelves and said wall defining said cavity.

45. A forearm extension for an adjustable extension arm, said forearm extension comprising an elongated hollow body having an inner surface and first and second ends, a first coupling separately attached to said first end of said body and a second coupling separately attached to said second end of said body, said first coupling including a first end having a bore therein adapted for pivotably mounting said forearm extension to a second end cap of an adjustable extension arm and a second end fixedly attached within the first end of said body, said second coupling including a first end having a bore therein adapted for coupling an electronic device thereto and a second end fixedly attached within the second end of said body wherein the second ends of said first and second couplings include a void, and a mass of aluminum material adhered to an inner surface of said hollow body within said void.

46. The forearm extension of claim 45 wherein said first and second couplings each include a stop member limiting the extent of engagement of said second ends of said couplings within said first ends of said body.

47. A method of making a channel member having a predetermined length for an adjustable extension arm, said method comprising forming an elongated hollow member of indefinite length relative to the length of said channel member, said elongated hollow member having a cavity extending therethrough, severing a portion of said elongated hollow member to provide a predetermined length hollow member, fixedly securing a reinforcing member having first and second ends within said cavity of said predetermined length hollow member, coupling one end of a first roller unit to said first end of said reinforcing member, and coupling one end of a second roller unit to said second end of said reinforcing member.

48. The method of claim 47, further including forming said first and second ends of said reinforcing member with first and second respective voids, forming said one end of said first roller unit with a third void and said one end of said second roller unit with a fourth void, aligning said first and second voids with a corresponding one of said third and fourth voids.

49. The method of claim 47, wherein said first and second ends of said reinforcing member comprises open ends, and wherein said coupling step comprises inserting said one end of said first and second roller units into a respective one of said open ends.

50. The method of claim 47, wherein said reinforcing member has a predetermined length by severing a portion forming said reinforcing member from an elongated reinforcing member of greater length.

51. A method of making an adjustable extension arm for mounting an electronic device thereto, said method comprising forming a first channel member having a cavity extending therethrough, wherein said first channel member has a predetermined length by severing a portion forming said first channel member from an elongated channel member of greater length, fixedly securing a first reinforcing member having first and second ends within said cavity, wherein said first reinforcing member has a predetermined length by severing a portion forming said first reinforcing member from an elongated reinforcing member of greater length, coupling one end of a first roller unit to said first end of said first reinforcing member and coupling one end of a second roller unit to said second end of said first reinforcing member; forming a second channel member having a cavity extending therethrough, wherein said second channel member has a predetermined length by severing a portion forming said second channel member from an elongated channel member of greater length, fixedly securing a second reinforcing member having first and second ends within said cavity, wherein said second reinforcing member has a predetermined length by severing a portion forming said second reinforcing member from an elongated reinforcing member of greater length, coupling one end of a third roller unit to said first end of said second reinforcing member and coupling one end of a fourth roller unit to said second end of said second reinforcing member; nesting said first and second channel members together; pivotably attaching one common end of said first and second channel members to a first end cap; and pivotably attaching the other common end of said first and second channel members to a second end cap.

52. The method of claim 51, wherein said first and second ends of said reinforcing member comprises open ends, and wherein said coupling step comprises inserting said one end of said first, second, third and fourth roller units into a respective one of said open ends.

* * * * *

UNITED STATES PATENT AND TRADEMARK OFFICE
CERTIFICATE OF CORRECTION

PATENT NO.    : 6,736,364 B2
DATED         : May 18, 2004
INVENTOR(S)   : Odd N. Oddsen Jr.

It is certified that error appears in the above-identified patent and that said Letters Patent is hereby corrected as shown below:

<u>Title page,</u>
Item [57], ABSTRACT,
Lines 6-7, "manufacture" should read -- manufacturer --.

<u>Column 3,</u>
Line 27, delete "are" and insert therefor -- is --.

<u>Column 10,</u>
Line 31, delete "an" and insert therefor -- arm --.

<u>Column 13,</u>
Line 53, "form" should read -- forms --.

<u>Column 15,</u>
Line 45, "member" should read -- members --.
Line 65, "coupling" should read -- couplings --.

<u>Column 16,</u>
Line 60, "member" should read -- members --.

<u>Column 17,</u>
Line 19, "voids" should read -- void --.
Line 37, after "said" delete ",".
Line 49, after "inner" insert -- surface of said body --.

<u>Column 18,</u>
Line 15, "comprises" should read -- comprise --.

<u>Column 19,</u>
Line 5, "comprises" should read -- comprise --.

<u>Column 20,</u>
Line 4, delte "nits" and insert therefor -- units --.
Line 15, after "fixedly" insert -- attaching --.
Line 62, "comprises" should read -- comprise --.

UNITED STATES PATENT AND TRADEMARK OFFICE
CERTIFICATE OF CORRECTION

PATENT NO. : 6,736,364 B2
DATED : May 18, 2004
INVENTOR(S) : Odd N. Oddsen Jr.

It is certified that error appears in the above-identified patent and that said Letters Patent is hereby corrected as shown below:

Column 22,
Line 15, "comprises" should read -- comprise --.

Signed and Sealed this

Fourth Day of January, 2005

JON W. DUDAS
*Director of the United States Patent and Trademark Office*